(12) United States Patent
Anwar et al.

(10) Patent No.: US 10,467,036 B2
(45) Date of Patent: Nov. 5, 2019

(54) DYNAMIC METERING ADJUSTMENT FOR SERVICE MANAGEMENT OF COMPUTING PLATFORM

(71) Applicant: International Business Machines Corporation, Armonk, NY (US)

(72) Inventors: Ali Anwar, Blacksburg, VA (US); Andrzej Kochut, Mount Kisco, NY (US); Anca Sailer, Scarsdale, NY (US); Charles O. Schulz, Ridgefield, CT (US); Alla Segal, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 14/926,384

(22) Filed: Oct. 29, 2015

(65) Prior Publication Data

US 2016/0094401 A1    Mar. 31, 2016

Related U.S. Application Data

(63) Continuation-in-part of application No. 14/871,443, filed on Sep. 30, 2015.
(Continued)

(51) Int. Cl.
*G06F 9/455* (2018.01)
*H04L 12/26* (2006.01)
(Continued)

(52) U.S. Cl.
CPC .......... *G06F 9/45558* (2013.01); *G06F 11/00* (2013.01); *H04L 41/142* (2013.01);
(Continued)

(58) Field of Classification Search
CPC ..... H04L 41/142; H04L 43/024; H04L 43/16; G06F 11/00
(Continued)

(56) References Cited

U.S. PATENT DOCUMENTS 8,015,367 B1    9/2011   Rao et al.
9,141,947 B1 *  9/2015   Furr .................... G06Q 20/102
(Continued)

OTHER PUBLICATIONS

A. Anwar et al., "Anatomy of Cloud Monitoring and Metering: An OpenStack Case Study," Proceedings of the 6th Asia-Pacific Workshop on Systems (APSys), 2015, 7 pages.
(Continued)

*Primary Examiner* — Minh Chau Nguyen
(74) *Attorney, Agent, or Firm* — Samuel Waldbaum; Ryan, Mason & Lewis, LLP

(57) ABSTRACT

Systems and methods are provided for dynamic metering adjustment for service management of a computing platform. For example, a plurality of virtual machines are provisioned across a plurality of computing nodes of a computing platform. Data samples are collected for a metric that is monitored with regard to resource utilization in the computing platform by the virtual machines. The data samples are initially collected at a predefined sampling frequency. The data samples collected over time for the metric are analyzed to determine an amount of deviation in values of the collected data samples. A new sampling frequency is determined for collecting data samples for the metric based on the determined amount of deviation. The new sampling frequency is applied to collect data samples for the metric, wherein the new sampling frequency is less than the predefined sampling frequency.

20 Claims, 15 Drawing Sheets

Related U.S. Application Data

(60) Provisional application No. 62/057,686, filed on Sep. 30, 2014.

(51) Int. Cl.
*H04L 12/24* (2006.01)
*G06F 11/00* (2006.01)

(52) U.S. Cl.
CPC ........ *H04L 43/024* (2013.01); *H04L 43/0817* (2013.01); *G06F 2009/45591* (2013.01); *G06F 2009/45595* (2013.01); *H04L 41/0843* (2013.01); *H04L 41/0896* (2013.01); *H04L 43/16* (2013.01)

(58) Field of Classification Search
USPC ........................................................ 709/223
See application file for complete search history.

(56) References Cited

U.S. PATENT DOCUMENTS

| | | | |
|---|---|---|---|
| 9,208,032 B1* | 12/2015 | McAlister | G06F 11/1435 |
| 2009/0276771 A1* | 11/2009 | Nickolov | G06F 9/4856 709/230 |
| 2010/0299703 A1* | 11/2010 | Altman | H04H 60/04 725/48 |
| 2011/0055389 A1 | 3/2011 | Bley | |
| 2011/0083131 A1 | 4/2011 | Pirzada et al. | |
| 2011/0295999 A1 | 12/2011 | Ferris et al. | |
| 2012/0167081 A1 | 6/2012 | Sedayao et al. | |
| 2012/0317274 A1* | 12/2012 | Richter | G06Q 10/06 709/224 |
| 2013/0227114 A1* | 8/2013 | Vasseur | H04L 41/044 709/224 |
| 2014/0120961 A1* | 5/2014 | Buck | H04W 4/12 455/466 |
| 2014/0180915 A1* | 6/2014 | Montulli | H04L 51/08 705/40 |
| 2014/0278623 A1* | 9/2014 | Martinez | G06Q 10/06 705/7.12 |
| 2015/0052287 A1 | 2/2015 | Venkatasubramanian et al. | |
| 2015/0120791 A1 | 4/2015 | Gummaraju et al. | |
| 2015/0154039 A1 | 6/2015 | Zada et al. | |
| 2016/0021024 A1 | 1/2016 | Parikh | |
| 2017/0201434 A1* | 7/2017 | Liang | H04L 43/08 |

OTHER PUBLICATIONS

IBM, "System and Method for Scalable Discovery and Monitoring of SAN Devices," ip.com, IPCOM000186557, Aug. 26, 2009, 4 pages.
Disclosed Anonymously, Method and System for Improving Storage Scalability in Workload Optimized Systems Using Workload Partitions (WPARS), Jun. 15, 2011, 5 pages.
M.J. Agarwal et al., "Problem Determination in Enterprise Middleware Systems using Change Point Correlation of Time Series Data," 10th IEEE/IFIP Network Operations and Management Symposium (NOMS), 2006, pp. 471-482.
A. Anwar et al., "Cost-Aware Cloud Metering with Scalable Service Management Infrastructure," IEEE 8th International Conference on Cloud Computing (CLOUD), Jul. 2015, pp. 258-292.
A. Anwar et al., "Scalable Metering for an Affordable IT Cloud Service Management," IEEE International Conference on Cloud Engineering (IC2E), Mar. 2015, pp. 207-212.
A. Brinkmann et al., "Scalable Monitoring Systems for Clouds," IEEE/ACM 6th International Conference on Utility and Cloud Computing (UCC), Dec. 2013, pp. 351-356.
C. Canali et al., "Automatic Virtual Machine Clustering Based on Battacharyya Distance for Multi-Cloud Systems," Proceedings of the 2013 International Workshop on Multi-Cloud Applications and Federated Clouds, Apr. 2013, pp. 45-52.
C. Chen et al., "Towards Verifiable Resource Accounting for Outsourced Computation," Proceedings of the 9th ACM SIGPLAN/SIGOPS International Conference on Virtual Execution Environments, Mar. 2013, pp. 167-178.
R. Iyer et al., "Virtual Platform Architectures for Resource Metering in Datacenters," ACM SIGMETRICS Performance Evaluation Review, Sep. 2009, pp. 89-90, vol. 27, No. 2.
X. Jiang et al., "'Out-of-the-Box' Monitoring of VM-Based High-Interaction Honeypots," Proceedings of the 10th International Conference on Recent Advanced in Intrusion Detection (RAID '07), 2007, pp. 198-218.
S. Kashyap et al., "Efficient Constraint Monitoring Using Adaptive Thresholds," IEEE 24th International Conference on Data Engineering (ICDE), Apr. 2008, pp. 526-535.
J. Lin et al., "Experiencing SAX: A Novel Symbolic Representation of Time Series," Data Mining and Knowledge Discovery, Oct. 2007, pp. 107-144, vol. 15, No. 2.
M. Liu et al., "On Trustworthiness of CPU Usage Metering and Accounting," Proceedings of the 2010 IEEE 30th International Conference on Distributed Computing Systems Workshops (ICDCSW), 2010, pp. 82-91.
S. Meng et al., "Volley: Violation Likelihood Based State Monitoring for Datacenters," 2013 IEEE 33rd International Conference on Distributed Computing Systems (ICDS), Jul. 2014, pp. 1-10.
S. Meng et al., "Reliable State Monitoring in Cloud Datacenters," 2012 IEEE Fifth International Conference on Cloud Computing (CLOUD), 2012, pp. 951-958.
W. Richter et al., "Agentless Cloud-Wide Streaming of Guest File System Updates," Proceedings of the 2014 IEEE International Conference on Cloud Engineering (IC2E), 2014, pp. 7-16.
P. Siirtola et al., "Improving the Classification Accuracy of Streaming Data Using SAX Similarity Features," Pattern Recognition Letters, Oct. 2011, pp. 1659-1668, vol. 32, No. 13.
L.M. Vaquero, "A Break in the Clouds: Towards a Cloud Definition," ACM SIGCOMM Computer Communication Review, Jan. 2009, pp. 50-55, vol. 39, No. 1.
C. Watson et al., "A Microscope on Microservices," The Netflix Tech Blog, http://techblog.netflix.com/2015/02/a-microscope-on-microservies.html, Feb. 18, 2015, 7 pages.
"About Advanced Message Queuing Protocol (AMPQ)," http://www.amqp.org/about/what, 2015, 2 pages.
"Ceilometer Quickstart," https://www.rdoproject.org/CeilometerQuickStart, 2014, 15 pages.
"Ceilometer Samples and Statistics," http://docs.openstack.org/developer/ceilometer/webapi/v2.html, 2015, 7 pages.
D. Belova et al., "Open TSBD as a Metering Storage for Open Stack Telemetry," https://groups.google.com/forum/#!topic/opentsdb/9O57MfpRXI0, Jul. 2014, 4 pages.
E. Glynn et al., "OpenStack Telemetry Rethinking Ceilometer Metric Storage with Gnocchi: Time-Series as a Service," Openstack Cloud Software, https://julien.danjou.info/talks/ceilometer-gnocchi.pdf, 2014, 24 pages.
"Welcome to the SAX (Symbolic Aggregate Approximation) Homepage!" http://www.cs.ucr.edu/~eamonn/SAX.htm, 2011, 4 pages.
"The R Project for Statistical Computing: What is R?," https://www.r-project.org/about.html, 2015, 2 pages.
"The SYSSTAT Utilities," http://sebastien.godard.pagesperso-orange.fr/, 2015, 9 pages.
"Tivoli Application Dependency Discovery Manager," http://www-03.ibm.com/software/products/en/tivoliap-plicationdependencydiscoverymanager, 2015 2 pages.
"Writing Rules for the State Correlation Engine," https://publib.boulder.ibm.com/tividd/td/tec/SC32-1234-00/en_US/HTML/ecodmst118.htm, 2015, 1 page.
Jason Meyers, "Survey: Cloud Still Underutilized," http://windowsitpro.com/article/cloud-business-issues/Survey-Cloud-still-underutilized-129534, WindowsITPro, Jan. 2011, 1 page.
CeilometerQuickStart—RDO, "Ceilometer QuickStart," https://openstack.redhat.com/CeilometerQuickStart, 2014, 13 pages.
Mongodb Manual 2.6.4, "Config Servers," http://docs.mongodb.org/manual/core/sharded-cluster-config-servers/, 2014, 2 pages.
Mongodb Manual 2.6.4, "Map-Reduce," http://docs.mongodb.org/manual/core/map-reduce/, 2014, 2 pages.

(56) References Cited

OTHER PUBLICATIONS

Mongodb Manual 2.6.4, "Sharded Cluster Query Routing," http://docs.mongodb.org/manual/core/sharded-cluster-query-router/, 2014, 6 pages.
Mongodb Manual 2.6.4, "Shards," http://docs.mongodb.org/manual/core/sharded-cluster-shards/, 2014, 2 pages.
Openstack Open Source Cloud Computing Software, "OpenStack," http://www.openstack.org/, 2014, 3 pages.
Openstack Docs: Current, "Openstack Docs," http://docs.openstack.org/, 2014, 3 pages.
Wiki, "OpenStack Wiki," https://wiki.openstack.org/wiki/Main_Page, 2014, 3 pages.
Nick Booth, "Companies Wasting £1BN a Year on Underused Cloud Capacity," http://www.datacenterdynamics.com/focus/archive/2014/06/companies-wasting-%C2%A31bn-year-underused-cloud-capacity, Jun. 2014, 3 pages.
K. Appleby et al., "Océano—SLA Based Management of a Computing Utility," IEEE/IFIP International Symposium on Integrated Network Management Proceedings, May 2001, pp. 855-868.
M. Armbrust et al., "A View of Cloud Computing," Communications of the ACM, Apr. 2010, pp. 50-58, vol. 53, No. 4.
M. Armbrust et al., "Above the Clouds: A Berkeley View of Cloud Computing," Electrical Engineering and Computer Sciences, University of California at Berkeley, Technical Report No. UCB/EECS-2009-28, Feb. 2009, 25 pages.
Salman A. Baset, "Open Source Cloud Technologies," Proceedings of the Third ACM Symposium on Cloud Computing (SOCC), Oct. 2012, 3 pages, Article No. 28.
A. Brinkmann et al., "Scalable Monitoring System for Clouds," IEEE/ACM 6th International Conference on Utility and Cloud Computing (UCC), Dec. 2013, pp. 351-356, Dresden, Germany.
R. Buyya et al., "InterCloud: Utility-Oriented Federation of Cloud Computing Environments for Scaling of Application Services," Proceedings of the 10th International Conference on Algorithms and Architectures for Parallel Processing (ICA3PP), May 2010, pp. 13-31, Busan, Korea, vol. Part I.
R. Buyya et al., "Cloud Computing and Emerging IT Platforms: Vision, Hype, and Reality for Delivering Computing as the 5th Utility," Future Generation Computer Systems, Jun. 2009, pp. 599-616, vol. 25, No. 6.
R.N. Calheiros et al., "CloudSim: A Toolkit for Modeling and Simulation of Cloud Computing Environments and Evaluation of Resource Provisioning Algorithms," Software—Practice and Experience, Jan. 2011, pp. 23-50, vol. 41, No. 1.
Rick Cattell, "Scalable SQL and NoSQL Data Stores," ACM SIGMOD Record, Dec. 2010, pp. 12-27, vol. 39, No. 4.
S. Das et al., "ElasTraS: An Elastic, Scalable, and Self Managing Transactional Database for the Cloud," ACM Transactions on Database Systems (TODS), Apr. 2013, 5 pages, vol. 38, No. 1, Article No. 5.
J. Dean et al., MapReduce: Simplified Data Processing on Large Clusters, Communications of the ACM, Jan. 2008, pp. 107-113, vol. 51, No. 1.
E. Elmroth et al., "Accounting and Billing for Federated Cloud Infrastructures," Eighth International Conference on Grid and Cooperative Computing (GCC), Aug. 2009, pp. 268-275, Lanzhou, Gansu, China.
Z. Gong et al., "PRESS: PRedictive Elastic ReSource Scaling for Cloud Systems," Proceedings of the 6th IEEE/IFIP International Conference on Network and Service Management (CNSM), Oct. 2010, 8 pages, Niagara Falls, Canada.
H. Goudarzi et al., "Multi-Dimensional SLA-Based Resource Allocation for Multi-Tier Cloud Computing Systems," Proceedings of the IEEE 4th International Conference on Cloud Computing (CLOUD), Jul. 2011, pp. 324-331.
Y. He et al., "RCFile: A Fast and Space-Efficient Data Placement Structure in MapReduce-Based Warehouse Systems," IEEE 27th International Conference on Data Engineering (ICDE), Apr. 2011, pp. 1199-1208, Hannover, Germany.
X. Jiang et al., ""Out-of-the-Box" Monitoring of VM-Based High-Interaction Honeypots," Proceedings of the 10th International Conference on Recent Advances in Intrusion Detection (RAID), Sep. 2007, pp. 198-218, Gold Goast, Australia.
S. Marston et al., "Cloud Computing—The Business Perspective," Decision Support Systems, Apr. 2011, pp. 176-189, vol. 51, No. 1.
P. Mell et al., "The NIST Definition of Cloud Computing," U.S. Department of Commerce, Computer Security Division, National Institute of Standards and Technology, Special Publication 800-145, Sep. 2011, 7 pages.
N. Munga et al., "The Adoption of Open Source Software in Business Models: A Red Hat and IBM Case Study," Proceedings of the Annual Research Conference of the South African Institute of Computer Scientists and Information Technologists (SAICSIT), 2009, pp. 112-121, Vaal River, Gauteng, South Africa.
D. Nurmi et al., "The Eucalyptus Open-Source Cloud-Computing System," 9th IEEE/ACM International Symposium on Cluster Computing and the Grid (CCGRID), May 2009, pp. 124-131, Shanghai, China.
W. Richter et al., "Agentless Cloud-Wide Streaming of Guest File System Updates," IEEE International Conference on Cloud Engineering (IC2E), 2014, pp. 7-16.
O. Sefraoui et al., "OpenStack: Toward an Open-Source Solution for Cloud Computing," International Journal of Computer Applications, Oct. 2012, pp. 38-42, vol. 55, No. 3.
H.N. Van et al., "SLA-Aware Virtual Resource Management for Cloud Infrastructures," Proceedings of the 9th IEEE International Conference on Computer and Information Technology (CIT), 2009, pp. 357-362, vol. 2, Xiamen, China.
L.M. Vaquero et al., "A Break in the Clouds: Towards a Cloud Definition," ACM SIGCOMM Computer Communication Review, Jan. 2009, pp. 50-55, vol. 39, No. 1.
Steve Vinoski, "Advanced Message Queuing Protocol," IEEE Internet Computing, Nov. 2006, pp. 87-89, vol. 10, No. 6.

* cited by examiner

100

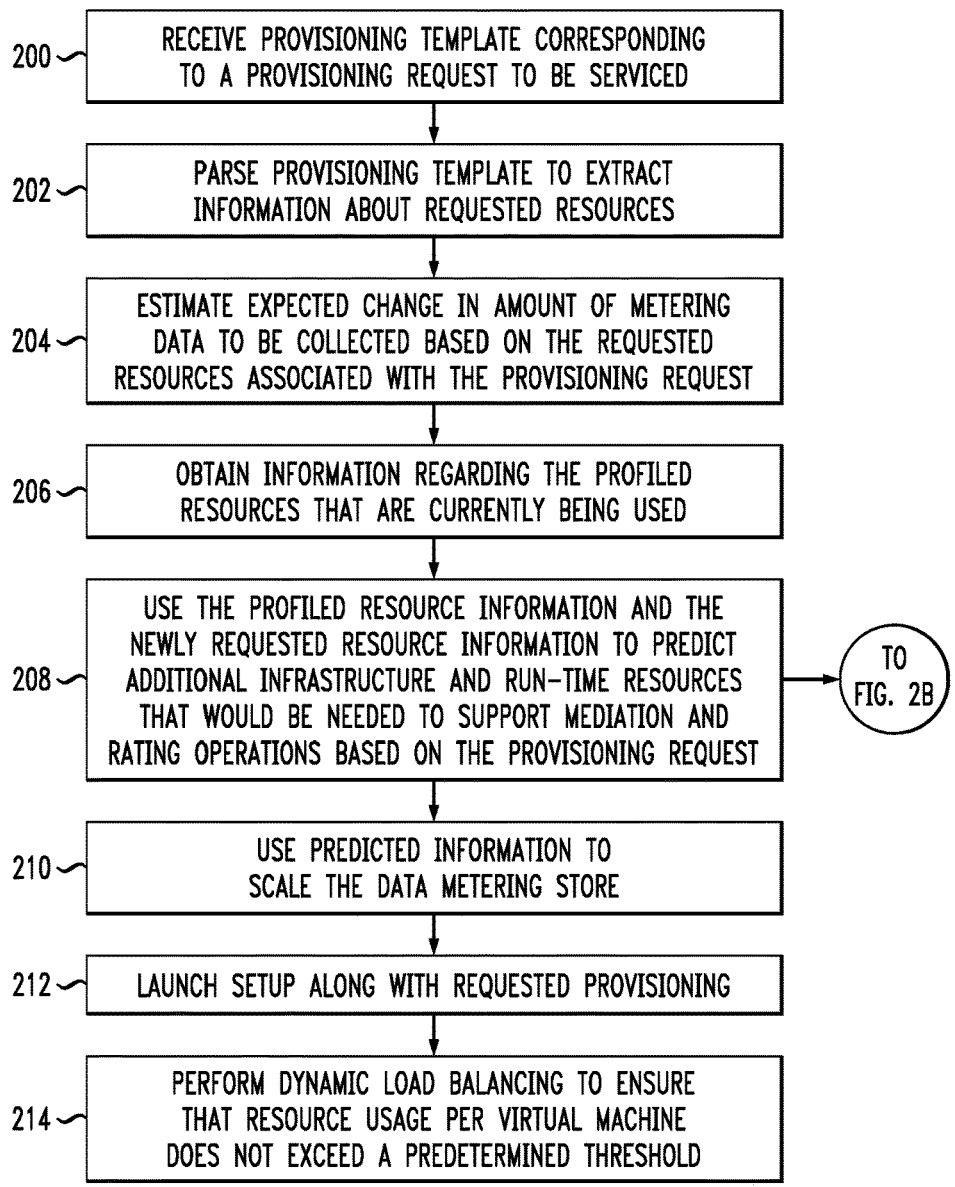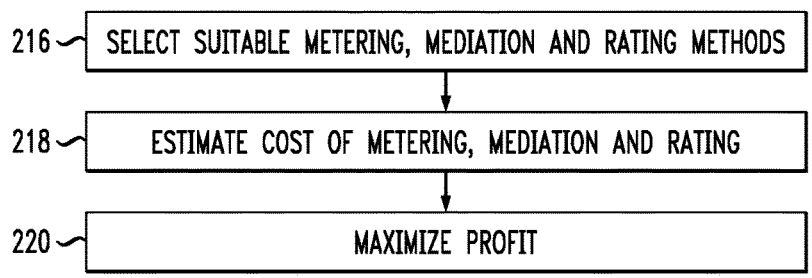

FIG. 3

LOAD BALANCING METHOD
300

302:
```
function REPLACE_VM(vm, el, r)
    rl ← List of VMs sorted by usage for r
    t ← Threshold for r
    for each virtual machine uvm in inverted rl do
        ucl ← current load on uvm for r
        if ucl + el ≤ t then
            Check threshold for rest of the resources
            use_this_vm ← uvm
            break
        else
            use_this_vm ← 0
        end if
    end for
    if use_this_vm = 0 then
        use_this_vm ← launch a new virtual machine
    end if
    Transfer load from vm to use_this_vm
end function
```

304:
```
for each resource r monitored by Resource Profiler do
    rl ← List of VMs sorted by usage for r
    t ← Threshold for r
    for each virtual machine vm in rl do
        cl ← current load on vm for r
        if cl ≥ t then
            el ← cl - t
            REPLACE_VM(vm, el, r)
        else
            break
        end if
    end for
end for
```

*FIG. 10*

| MEDIATION | CPU | CPU% | RAM | RAM% | DIST. LINEAR SCALING | STORAGE | LICENSING COST | MGMT. COST | IT infraS. COST | VOLUME (S/M/L) |
|---|---|---|---|---|---|---|---|---|---|---|
| TECHNIQUE 1 | X | ... | ... | | | | | | | |
| TECHNIQUE 2 | Y | ... | ... | | | | | | | |
| TECHNIQUE 3 | Z | ... | ... | | | | | | | |

| RATING | CPU | CPU% | RAM | RAM% | DIST. LINEAR SCALING | STORAGE | LICENSING COST | MGMT. COST | IT infraS. COST | VOLUME (S/M/L) |
|---|---|---|---|---|---|---|---|---|---|---|
| TECHNIQUE 1 | X | ... | ... | | | | | | | |
| TECHNIQUE 2 | Y | ... | ... | | | | | | | |
| TECHNIQUE 3 | Z | ... | ... | | | | | | | |

FIG. 11

|  | METERS | MONTHLY | WEEKLY | DAILY | HOURLY |
|---|---|---|---|---|---|
| IaaS | $/CPU<br>$/RAM<br>$/NW<br>. | COST-11 | COST-12 | ... | ... |
| PaaS | $/db2 TRANS.<br>$/db2 VOL.<br>. | COST-21 | COST-22 | ... | ... |
| SaaS | $/# OF PATCH<br>$/MONITOR RES.<br>. | COST-31 | COST-32 | ... | ... |

| METRIC PROFILE ITEMS (502) | | | | METRIC POLICY (504) |
|---|---|---|---|---|
| CRITICAL | DEPENDENCY ROOT | USED FOR USAGE BASED CHARGING | INDEPENDENT METRIC | |
| ✓ | * | * | * | CONSERVATIVE SAMPLING AND STORAGE |
| X | ✓ | * | * | CONSERVATIVE SAMPLING AND STORAGE |
| X | X | ✓ | * | CONSERVATIVE SAMPLING AND AGGREGATED STORAGE [a] |
| X | X | X | ✓ | PER TIER SAMPLING AND CONSERVATIVE STORAGE |
| X | X | X | X | PER TIER SAMPLING AND AGGREGATED STORAGE |

EXAMPLE OF MAPPING BETWEEN METRIC PROFILE AND METRIC POLICY (*MEANS EITHER OF ✓ OR X).

DYNAMIC METERING ADJUSTMENT FOR SERVICE MANAGEMENT OF COMPUTING PLATFORM

CROSS-REFERENCE TO RELATED APPLICATIONS

This application is a Continuation-in-Part of U.S. patent application Ser. No. 14/871,443, filed on Sep. 30, 2015, which claims priority to U.S. Provisional Application Ser. No. 62/057,686, filed on Sep. 30, 2014, the disclosures of which are incorporated herein by reference.

TECHNICAL FIELD

The field generally relates to network computing and, in particular, to systems and methods for service management of computing platforms such as cloud computing networks.

BACKGROUND

The cloud computing model has emerged as the de facto paradigm for providing a wide range of services in the IT industry such as infrastructure, platform, and application services. As a result, various vendors offer cloud based solutions to optimize the use of their data centers. A key enabler for cloud computing is resource virtualization, which enables provisioning of multiple virtual machines (VMs) to provide a service, or a plurality of disparate services, on the same physical host. In addition, resource virtualization provides benefits such as efficiency, resource consolidation, security, provides support for Service Level Agreements (SLAs), and allows for efficient scaling of services that are provided by a cloud computing platform. Resource virtualization, however, raises several issues.

For example, customers of the cloud providers, particularly those building their critical production businesses on cloud services, are interested in collecting and logging detailed monitoring data from the deployed cloud platform to track in real time the health of their thousands of service instances executing on the cloud platform. In this regard, a crucial challenge, especially for a sustainable IT business model, is how to adapt cloud service management, and implicitly its cost (e.g., impact of associated monitoring overhead) to dynamically accommodate changes in service requirements and data centers.

Furthermore, as cloud services journey through their lifecycle towards commodities, cloud computing service providers are faced with market demands for charge models that are based on fine-grained pay-per-use pricing, where customers are charged for the amount of specific resources, e.g., volume of transactions, CPU usage, etc., consumed during a given time period. This is in contrast to historical coarse-grained charge models where cloud service providers charge their customers only on a flat-rate basis, e.g., in the form of a monthly subscription fee. Although this pricing methodology is straight forward and involves little management and performance overhead for the cloud service providers, it does not offer the competitive advantage edge of the usage based pricing. As a particular technology or service becomes more of a commodity (e.g., IaaS (Infrastructure as a Service), or SaaS (Software as a Service)), customers are interested in fine-grained pricing models based on their actual usage. For instance, from the perspective of a SaaS customer, it is more advantageous to be charged based on the usage of the platform (e.g., the number of http transactions or volume of the database queries) instead of a fixed monthly fee, especially when the usage is low.

In this regard, cloud service providers, looking to maintain a competitive advantage by effectively adapting to versatile charging policies, have started to promote pay-per-use. However, usage based pricing brings a new set of service management requirements for the service providers, particularly for their revenue management. The finer-grain metering for usage based pricing requires the system to monitor service resources and applications at appropriate levels to acquire useful information about the resource consumption that is to be charged for. This may result in collecting significantly large amounts of metered data. In addition, computational resources are needed to process the metered data to perform revenue management specific tasks.

The resource capacity requirements for non-revenue generating systems such as monitoring and metering fluctuate largely with, e.g., service demand (e.g., the number of service instances), service price policy updates (e.g., from single metric based charge to complex multi-metric based charge), the resolution of the system behavior exposed (e.g., from higher-level aggregations to individual runaway thread), while their unit cost changes depending on the operational infrastructure solution (e.g., on premise, traditional outsourcing or IaaS). Therefore, a crucial challenge for cloud service providers is how to manage and control service management data and functions, and implicitly the costs of such service management data and functions, in order to profitably remain in the race for the cloud market.

SUMMARY

Embodiments of the invention include systems and methods for dynamic metering adjustment for service management of a computing platform. For example, one embodiment includes a method for managing a computing platform. A plurality of virtual machines are provisioned across a plurality of computing nodes of a computing platform. Data samples are collected for a metric that is monitored with regard to resource utilization in the computing platform by the virtual machines. The data samples are initially collected at a predefined sampling frequency. The data samples collected over time for the metric are analyzed to determine an amount of deviation in values of the collected data samples. A new sampling frequency is determined for collecting data samples for the metric based on the determined amount of deviation. The new sampling frequency is applied to collect data samples for the metric, wherein the new sampling frequency is less than the predefined sampling frequency.

Other embodiments of the invention will be described in the following detailed description, which is to be read in conjunction with the accompanying drawings.

DESCRIPTION OF THE DRAWINGS

FIGS. 2A and 2B illustrate a flow diagram of a method for scalable service management in a computing platform, according to an embodiment of the invention.

FIG. 3 shows pseudo code of a load balancing method according to an embodiment of the invention.

FIG. 10 illustrates profile information that is used to determine resource requirements for mediation and rating methods, according to an embodiment of the invention.

FIG. 11 illustrates a method for maximizing profit according to an embodiment of the invention.

FIG. 13 illustrates a method for mapping metric profiles to metric policies according to an embodiment of the invention.

DETAILED DESCRIPTION

Figure 1:
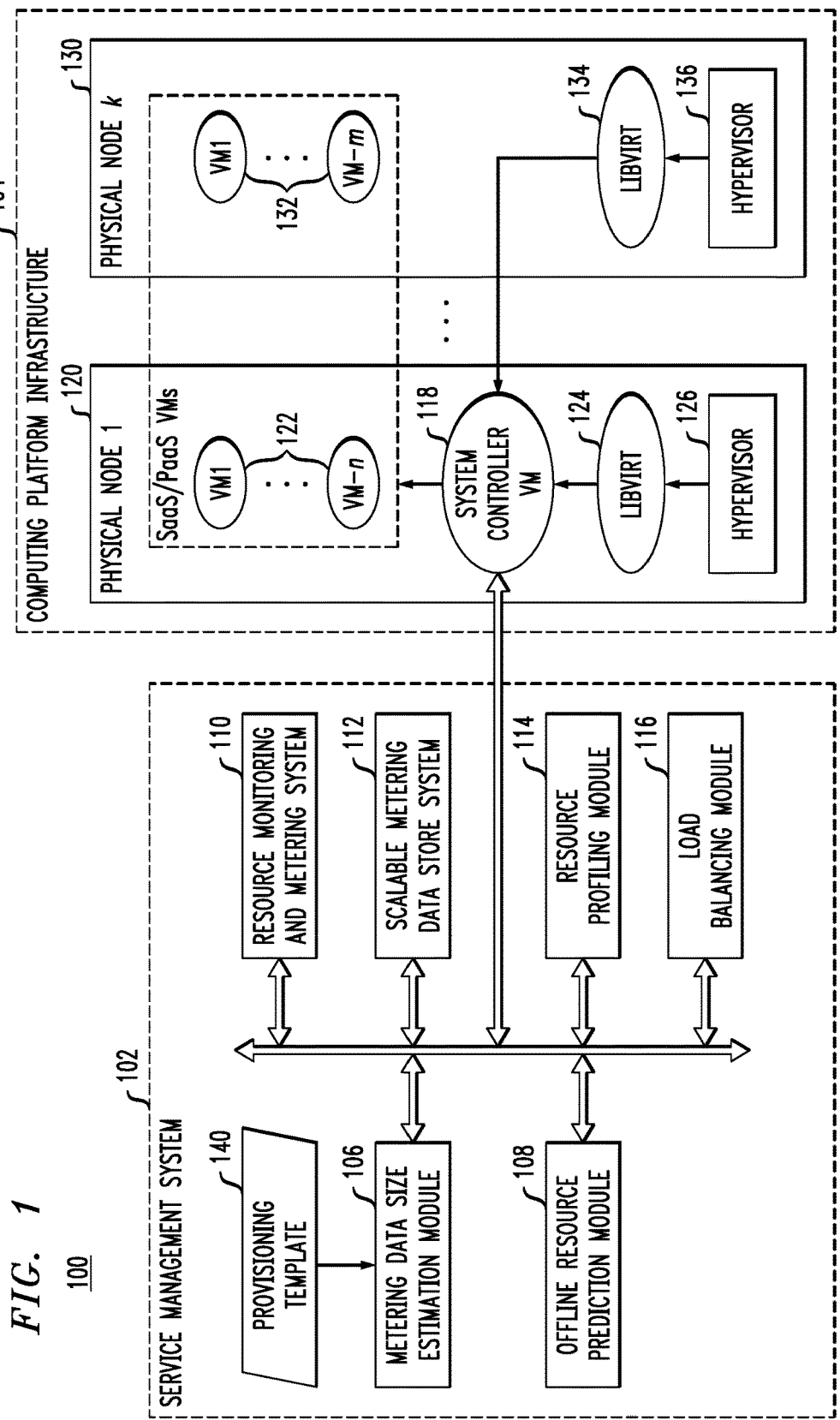
FIG. 1 illustrates a computing platform which implements a scalable service management system, according to an embodiment of the invention.

Embodiments of the invention include systems and methods to support service management for computing platforms such as cloud computing networks. In particular, systems and methods are provided to support service management operations, such as metering, mediation, and/or rating operations for revenue management and their adaptability to business and operational changes. Embodiments of the invention include frameworks that enable service providers to scale their revenue systems in a cost-aware manner, wherein existing or newly provisioned SaaS virtual machines are dynamically provisioned/utilized (instead of dedicated setups) to deploy service management systems (e.g., revenue management). For the onboarding of new customers, a framework according to an embodiment of the invention is configured to perform an off-line analysis to recommend appropriate revenue tools and their scalable distribution by predicting the need for resources based on historical usage. At runtime, the framework employs an innovative load balancing protocol to fine tune the resource distribution based on the real computation usage and the workload demand of customers.

As noted above, usage based pricing policies bring a new set of service management requirements for service providers, particularly for their revenue management. For example, usage based pricing requires the collection of significant metered data and techniques for rating according to a detailed price plans. As such, usage based pricing required finer-grain metering, which may impact the performance of resources. This is due to the fact that service resources and applications need to be monitored at the appropriate level to collect enough management data to determine the usage which has to be charged for, which may result in collecting a large amount of management data. Furthermore, the service management data (e.g., metering data) needs to be processed in order to perform: (1) mediation functions, i.e., transformation of metered data into the desired units of measure expected by the usage price policy, e.g., average, maximum or minimum usage; (2) rating functions based on the price policy for generating customer invoices, e.g., multiplying usage by per unit rate; and (3) calculations required to answer customers' queries regarding usage, e.g., variance in usage. Hence, additional resources are required not only to store service management data, but also to process service management data to support finer-grained service management.

In this regard, service providers that align their services price plan to usage based pricing have to carefully choose the metering, mediation, and rating tools and infrastructure to minimize the cost of the resource requirements for performing them. Thus, a first step in performing this cost benefit analysis is to accurately estimate the cost associated with monitoring, storing, and processing the management data for the various metering and rating tools. The cost of fine grained monitoring depends on the volume of management data that is collected for the purpose of, e.g., metering. The current practice is to use a system setup for collecting management data (e.g., metering data for pricing) which is separate from, and in addition to, a cloud health monitoring setup which collects management data that provides information with regard to, e.g., performance and availability of resources and resource usage contention. The extra resources used for such revenue management place additional burden on the cloud service provider. In contrast, embodiments of the invention implement methods to consolidate metering for multiple purposes and avoid collecting of the same data by multiple agents, and to efficiently collect and estimate the volume of metering data.

A fine-grain pricing model necessitates dynamic modification of price plans offered to customers based on the market demand. In this context, a key challenge is how to provide a scalable metering framework which can adapt to price policy updates and changing loads in a data center, while minimizing the additional resources, performance impact, and interference that may result from the metering, so as to avoid a toll on the business outcome. Since the selection of different pricing policies results in different sizes of collected metering data, the system setup is expected to store and process metering data of varying size without wasting resources. Typically, cloud service providers use a dedicated set of VMs for their service management, which they manually expand based on the increasing load in their data centers. Depending on the cloud service type, for instance SaaS, cloud service providers may themselves be customers of an IaaS or PaaS (Platform as a Service). As such, they are charged for this dedicated set of VMs. This infrastructure cost is additional to the cost of the tools (e.g., for license per volume, maintenance etc.). The goal is to minimize the footprint of this nonrevenue-generating infrastructure, thus minimizing service management infrastructure cost, or ideally eliminating such cost.

In general, embodiments of the invention provide a framework for addressing metering and rating operations of revenue service management and the adaptability thereof to price policies and operational changes. For example, as explained in further detail below, embodiments of the invention implement various systems and methodologies to (i) provide an effective mechanism to accurately estimate the size of service management data (e.g., metering data) generated by a telemetry tool in response to resource provisioning requests; (ii) provide an auto-scalable data storage system for storing management data; (iii) provide an effective mechanism to track, record and analyze behavior of existing instances in an observed cluster deployed within a cloud computing system; (iv) provide an offline prediction system to predict resources that would be required to perform service management functions (such as metering, mediation, rating, etc.) and further refine or otherwise fine tune the service management via a runtime load balancer; and to (v) provide a framework to optimally utilize existing or newly provisioned VM instances to perform such service management functions. These systems and methodologies will be discussed in further detail below with reference to FIG. 1, which illustrates overall architecture implementing such features and constituent system components and their interactions.

For illustrative purposes, embodiments of the invention will be described in the context of known enabling technologies such as the well-established cloud ecosystem of OpenStack, which is an open source project that provides a massively scalable cloud operating system. OpenStack adopts a modular design and has become the de facto cloud computing platform for managing large pools of compute, storage, and networking resources in modern data centers. The platform supports a management dashboard that gives administrators control over the resources, while empowering users to provision resources through a flexible web interface. Another goal of the OpenStack project is to build an open-source community of researchers, developers and enterprises. Currently, more than 200 companies such as IBM, Cisco, Oracle, and RedHat, are participating in the project. This allows embodiments of the invention to be quickly adapted in real enterprises. There are currently more than sixteen official modules, each providing a unique functionality, supported by OpenStack. In the following, we briefly describe some of these modules, which can be used to implement embodiments of a cloud computing platform according to the invention:

Nova: provides on-demand computing resources by provisioning and managing VMs using available hypervisors.

Neutron: is a pluggable and scalable system for managing networks and IP addresses within the OpenStack ecosystem.

Cinder: is a storage as a service for applications, and maps block devices, from a variety of storage solutions, to OpenStack compute instances.

Ceilometer: is a telemetry service for monitoring and metering resources and services of a cloud computing platform.

Heat: is a service to orchestrate multiple composite cloud applications. It employs the format of Amazon Web Services CloudFormation template.

Swift: implements an API-accessible storage platform that can be integrated directly into cloud based applications, or can also be used just for backup, archiving, and data retention.

Glance: maintains a list of bootable disk images and supports a service for storing and retrieving such images.

Horizon: provides both administrators and users with a graphical interface to: i) provision and access the cloud based resources; and ii) access services such as billing, monitoring, and any available management tools.

FIG. 1 illustrates a computing platform which implements a scalable service management system, according to an embodiment of the invention. In particular, FIG. 1 illustrates a cloud computing platform 100 comprising a service management system 102 and a computing platform infrastructure 104 (e.g., data center). The service management system 102 comprises a metering data size data estimation module 106, an offline resource prediction module 108, a resource monitoring and metering module 110, a scalable metering data store system 112, a resource profiling module 114, and a load balancing module 116. The constituent components of the service management system 102 communicate with a system controller 118. In one embodiment, the system controller 118 is implemented using a dedicated virtual machine that operates on one or more computing nodes of the computing platform infrastructure 104.

The computing platform infrastructure 104 comprises a plurality of computing nodes 120 and 130, which represent different physical machines (e.g., server computers) that are part of a data center, for example. For ease of illustration, FIG. 1 depicts two computing nodes 120, 130, although the system 100 can include a plurality (k) of different computing nodes (wherein k is in the order of hundreds or thousands, for example). The computing node 120 comprises a plurality (n) of virtual machines 122, and an associated virtualization API 124 (LibVirt) and hypervisor 126. Similarly, the computing node 130 comprises a plurality (m) of virtual machines 132, and an associated virtualization API 134 and hypervisor 136. As depicted in FIG. 1, the system controller 118 is a dedicated virtual machine that executes on the computing node 120.

In one embodiment, the hypervisors 126 and 136 are virtual machine monitors comprised of software, firmware and/or hardware, which create and run the virtual machines 122 and 132 (guest operating systems) on the respective host nodes 120 and 130. The hypervisors 126 and 136 provide the respect set of virtual machines 122 and 132 with a virtual operating platform, and manage the execution of the respective virtual machines 122 and 132. The hypervisors 126 and 136 allow the virtual machines 122 and 132 to share the processor, memory and other resources of their respective host node 120 and 130. The hypervisors 126 and 136 control the host processor and resources, allocating what is needed to the respective set of virtual machines 122 and 132 while ensuring the virtual machines do not disrupt each other. The LibVirt modules 124 and 134 are virtualization APIs (or libraries), which provide hypervisor-agnostic APIs to securely manage the respective virtual machines 122 and 132 running on the respective host nodes 120 and 130. The LibVirt modules 124 and 134 each provide a common API for common functionality implemented by the hypervisors 126 and 136.

The resource monitoring and metering system 110 is configured to provide a telemetry service for monitoring and metering resources and services provided by the cloud computing platform 100. In one embodiment of the invention, the resource monitoring and metering system 100 is implemented using OpenStack's Ceilometer telemetry service, which provides an infrastructure to collect detailed measurements about resources managed by a cloud ecosystem implemented using OpenStack. In general, the main components of Ceilometer can be divided into two categories, namely agents (e.g., compute agents, central agents, etc.), and services (e.g., collector service, API service, etc.). The compute agents poll the local LibVirt modules 124, 134 (daemons) to fetch resource utilization of the currently launched virtual machines 122 and 132 and transmit the resource utilization data as AMQP (Advanced Message Queuing Protocol) notifications on a message bus (Ceilometer bus). Similarly, central agents poll public RESTful APIs of OpenStack services, such as Cinder and Glance, to track resources and emit the resource data onto OpenStack's common message bus (called Notification bus). On the other hand, a collector service collects the AMQP notifications from the agents and other OpenStack services, and dispatches the collected information to a metering database. The API service presents aggregated metering data to a billing engine.

In Ceilometer, resource usage measurements, e.g., CPU utilization, Disk Read Bytes, etc., are performed by meters or counters. Typically, there exists a meter for each resource being tracked, and there is a separate meter for each instance of the resource. The lifetime of a meter is decoupled from the associated resource, and a meter continues to exist even after the resource it was tracking has been terminated. Each data item collected by a meter is referred to as a "sample," and each sample comprises a timestamp to mark the time of collected data, and a volume that records the value. Ceilometer also allows service providers to write their own meters. Such customized meters can be designed to conveniently collect data from inside launched virtual machines, which (for a solution or software) allows cloud service providers to track application usage as well. In Ceilometer, a polling interval between two events is specified in a pipeline.yaml file, and the polling interval can be adjusted according to the cloud provider requirements. Furthermore, a collector can store the metering data in any kind of database. The size of collected data is expected to be large, so by default, Ceilometer utilizes a database such as Mongo DB for this purpose.

In the embodiment of FIG. 1, the system controller 118 is configured to operate as a data collector for the telemetry service implemented by the resource monitoring and metering system 110. In this regard, the system controller 118 serves as a centralized agent that polls each of the LibVirt modules 124 and 134 across the computing nodes 120 and 130 to obtain resource utilization data and track resources of all the virtual machines 122 and 132 across the compute nodes 120 and 130. This eliminates the need of implementing dedicated agents on each computing node 120 and 130. However, in other embodiments of the invention, dedicated agents (e.g., metering agents) can implemented on each computing node 120 and 130.

The scalable metering data store system 112 is configured to provide an auto-scalable metering store framework to support mediation and rating functions. The metering related data that is collected and by the resource monitoring and metering system 110 is stored in a metering store (e.g., database system) using the scalable metering data store system 112. In a cloud ecosystem, there is typically a vast amount, and continually growing volume of metering data. As such, it is desirable to implement a data store (e.g., database) setup which is scalable and efficient, and which can handle complex queries in a timely fashion. In this context, billing methods that implement fine-grained pricing plans require high-frequency querying of the metering data store.

In one embodiment of the invention, the scalable metering data store system 112 is implemented using the known MongoDB data store system. In particular, in one embodiment of the invention, an auto-scalable setup is implemented for MongoDB to act as the metering store for Ceilometer, wherein the auto-scalable setup is instantiated on the same set of VMs that are used to provide SaaS (as VMs to support typical SaaS workloads have been observed to not be fully utilized). OpenStack allows integration of multiple databases with Ceilometer for the purpose of storing metering data, e.g., MySQL, MongoDB, etc. MongoDB is a preferred database system for implementation in OpenStack because of features such as flexibility and allowing the structure of documents in a collection to be changed over time. In the following, we discuss MongoDB and various features that enable scaling of the metering data storage system.

As is known in the art, MongoDB is a cross platform document-oriented NoSQL (non SQL or non-relational) database. MongoDB eschews the traditional table-based relational database structure in favor of JSON-like documents with dynamic schemas, making the integration of metering data easier and faster. MongoDB offers several key features of sharding and replication, which make it a preferred system to implement an auto-scalable metering data storage system according to an embodiment of the invention.

Sharding is a method of storing data across multiple machines (shards) to support deployments with very large datasets and high throughput operations. Sharding helps in realizing scalable setups for storing metering data because the data collected by Ceilometer is expected to increase linearly over time. This is especially true for production servers. A sharded setup of MongoDB comprises three main components as follows:

Shards: store the data. Increasing the number of shards reduces the amount of data each machine in a setup needs to hold. As a result a setup can increase capacity and throughput horizontally.

Query Routers: or "Mongo instances" interface with the querying application and direct operations to appropriate shard or shards.

Config Servers: store the cluster's metadata, e.g., mapping of the cluster's dataset to shards, which is then used to target operations to specific shards. For example, an existing practice in production setups is to have three Config servers.

Replication is a feature that allows multiple machines to share the same data. Unlike sharding, replication is mainly used to ensure data redundancy and facilitate load balancing. In addition, MongoDB supports the use of the MapReduce framework for batch processing of data and aggregation options.

A first step in realizing an auto-scalable metering data storage system (based on, e.g., MongoDB) according to an embodiment of the invention is to determine when scaling is needed. For this purpose, several kinds of metrics can be utilized: (i) OS-level metrics, e.g., CPU, memory, disk usage, etc., and (ii) MongoDB performance statistics, e.g., query time, writes/s, reqs/s, etc. Since the MongoDB instances are running on the same virtual machines as those virtual machines providing user services, the virtual machines are already being monitored and thus the monitoring data can be reused to determine the OS-level information needed for this purpose as well. This information, coupled with periodically collected MongoDB statistics, is then used to determine if the metering store is loaded beyond a pre-specified high threshold or below a low threshold, and scaling decisions are made accordingly.

A next step in realizing an auto-scalable database system is to enable scaling of the metering store. For this purpose, in one embodiment of the invention, our framework exploits creation of additional MongoDB replica sets. These replica sets are added as shards to achieve further partitioning of data, which in turn support the scalability of the storage system. A design decision while performing sharding is to carefully choose the sharding key. To this end, we keep track of the speedup achieved with various sharding keys and choose the best option. It is to be noted that replication and sharding are not mutually exclusive features, and can be scaled individually based on the monitored reads/s or writes/s throughput observed through a MongoDB performance monitor.

The metering data size estimation module 106 is configured to calculate an expected change in the size of metering data. For this purpose, the metering data size estimation module 106 uses resource information obtained from a provisioning template file 140 (e.g., a Heat template file) of a given provisioning request, and determines a set of meters that are required to perform the necessary monitoring and metering. Next, the expected total number of metering events on various polling intervals is calculated along with the average event object size. The number of events are calculated by, e.g., parsing the pipeline.yaml file to fetch the sampling frequency of each meter. The average object event size is variable and depends on the type of meters launched and their sampling frequency or polling interval. To this end, the metering data size estimation module 106 keeps track of the changes in the event object size per meter and estimates the value by taking the average of n previously collected values (e.g., n=3). The metering data size estimation module 106 then averages these values across the meters to determine the overall average object size.

An alternative approach is to directly track the overall average object event size from the database of the scalable metering data store system 112. The following is an example of a sample collected from the scalable metering data store system 112 to measure an overall average object size.

```
> db.stats()
{
  "db":"ceilometer",
  "collections":6,
  "objects":2239713,
  "avgObjSize":1189.759382,
  "dataSize":2664719556,
  "storageSize":3217911760,
  ...
}
```

In this example, the expected size of metering data (2664719556 bytes) is determined by multiplying the number of event objects (2239713) with the average event object size (1189.759382 bytes).

In general, the resource profiling module 114 is configured to track resource utilization of each of the virtual machines 122 and 132. As noted above, the resource monitoring and metering module 110 launches various meters for monitoring and metering the usage of different resources per virtual machine, e.g., CPU, memory, storage, networking, etc. The resource profiling module 114 intercepts such resource usage information at the scalable metering data store system 112, and uses the resource usage information to track the per-VM resource utilization. A challenge is that the collected metering data only gives an instantaneous view of a VM's resource usage at a particular time instance, and does not necessarily portray the overall usage. To address this, in one embodiment of the invention, the resource profiling module 114 is configured to use a sliding window across a previous number (n) of metering samples to calculate a moving average, wherein the moving average is utilized as an estimate of the current per-VM resource utilization. An alternate approached to intercepting the data is to query the metering store 112 for overall utilization. However, the querying approach could burden the database and impact overall efficiency. The resource profiling module 114 also maintains queues of resources sorted based on estimated utilization. This information can be used to determine free resources within each VM, which in turn supports effective scaling of the metering setup.

The offline resource prediction module 108 is configured to analyze the data collected by the resource profiling module 114 and provide an approximate estimate of the resources that would be required for the associated metering setup. A possible trade-off that should be considered in the estimation of needed resources is whether to use less revenue management resources at the expense of performance degradation in terms of average time taken to process the collected metering data. In one embodiment, system managers are allowed to manage this trade-off by specifying the expected processing query time, query rate, and average load on the system setup, as an input to the offline resource prediction module 108. Based on the provided input, the offline resource prediction module 108 outputs a recommended setup to achieve an effective estimate for driving decision of system implementation.

The load balancing module 116 is implemented to ensure that service level agreements are met. The selection of virtual machines for launching replicas to scale-up the metering data store system 112 is an important consideration, as the additional load may affect the performance of a virtual machine. This can lead to a point where the virtual machine can no longer provide sufficient performance for the provided SaaS. Typically, cloud service providers are bound to ensure that certain service level agreements are met. Thus, the service provider may have to mitigate or launch additional resources in the face of a potential threat of a service level agreement violation. To avoid this, an embodiment of the invention utilizes a load balancer that actively tracks the infrastructure utilization of each virtual machine by coordinating with the resource profiling module 114. If resource utilization on any virtual machine exceeds a certain threshold, some or all of the workload (e.g., mediation and/or rating) from the overloaded virtual machine is either transferred to an existing virtual machine with a lower load or a new virtual machine is launched to handle the overload. The load balancing module 116 utilizes a load balancing process (as will be discussed below with referent to FIG. 3) to move shards or replica sets.

In one embodiment of the invention, the load balancing module 116 is implemented using an internal load balancer of MongoDB, which upon the creation of a new shard, transfers chunks of 64 MB of data from other machines to the newly created/added shard to evenly distribute the total number of chunks.

In one embodiment of the invention, a predefined threshold value is selected for triggering load balancing. The threshold is set so as to ensure that each resource per VM is not over-utilized by the metering framework to an extent where the performance of the provided SaaS is affected. Since the nature of service level agreements vary with the type of SaaS, as well as resource types and configurations, the predefined threshold for triggering load balancing is not fixed. Instead, such threshold varies from solution to solution and resource managers can evaluate and determine the threshold values as appropriate.

The system controller 118 is configured to control and fine-tune the scalable metering data store system 112, the resource profiling system 114 and the load balancing module 116. The system controller 118 also serves as a facilitator for the various module operations by providing access to the collected data. As noted above, in one embodiment of the invention, the system controller 118 is run in a dedicated virtual machine on a given computing node (e.g., node 120 in FIG. 1) to ensure that it is not affected by the performance and workload dynamics of the resources.

By default, OpenStack installs a standalone instance of MongoDB to store metering data. In order to perform mediation and rating, cloud service providers typically use a separate set of dedicated physical machines for the standalone installation of MongoDB. In case of significantly large data sizes, in a conventional approach, a distributed system, e.g., Hadoop Distributed File System (HDFS), is used for data processing. This conventional approach requires redistribution of metering data from the metering store to the HDFS system. This approach is burdensome because data ingestion into the HDFS system is known to be a major performance bottleneck, as well as "expensive" in terms of data copying. In contrast, embodiments of the invention provide an advantage in that that metering data is not redistributed from the metering store to another system. Instead, in one embodiment of the invention, metering data is collected in a distributed setup to begin with, which avoids extra copying and ingestion challenges and overheads associated with the conventional approach.

Another advantage of our framework is that it allows cloud service providers to offer not only the fine-grained metering information, but also customizable price plans, e.g., charging customers only on CPU utilization, etc. Furthermore, our approach can be extended to implement metering services for IaaS by: (i) launching the metering setup on physical nodes instead of VMs so that customers do not get access to the collected metered data; (ii) enabling monitoring of the physical nodes (within Ceilometer for example) for tracking infrastructure utilization per physical node instead of per VM; and (iii) updating the load balancer to effectively perform in heterogeneous environments so that cores not used by Nova, for example, can be used to launch metering services.

FIGS. 2A and 2B illustrate a flow diagram of a method for scalable service management of a cloud computing system, according to an embodiment of the invention. For purposes of illustration, the flow diagram of FIGS. 2A and 2B will be discussed with reference to the cloud computing system 100 of FIG. 1, wherein the method steps of FIGS. 2A and 2B illustrate various modes of operation of constituent components of the cloud computing system 100 of FIG. 1. In general, the service management system 102 of the cloud computing system 100 initiates a sequence of operations when servicing a provisioning request. As an initial step, the service management system 102 receives a provisioning template file 140 that corresponds to the provisioning request to be serviced (block 200). The provisioning template file 140 is input to the metering data size estimation module 106, wherein the provisioning template 140 is parsed to extract information about the requested resources associated with the new provisioning request (block 202).

The metering data size estimation module 106 uses the information about the requested resources to estimate an expected change in the amount of metering data that will need to be collected by the resource monitoring and metering system 110 based on the new provisioning request, which is to be stored in the scalable metering data store system 112 (block 204). Meanwhile, the resource profiling module 114 keeps track of the resources that are already in use, and maintains profiles of resource usage for mediation and rating purposes.

The resource prediction module 108 obtains information regarding the profiled resources that are currently in use (block 206), and then uses the profiled resource information and the newly requested resources information to predict (or estimate) additional infrastructure and run-time resources that would be needed to support mediation and rating operations based on the provisioning request (block 208). In one embodiment of the invention, the resource prediction module 108 calculates the resource requirements that are needed for a plurality of different mediation and rating techniques using a set of technique profiles (FIG. 10) that are generated using historical data. In another embodiment, the resource prediction module 108 calculates the resource requirements needed for collecting metering data.

The predictions made by the resource prediction module 108 are used to scale the metering data store (block 210). The resource prediction module 108 then communicates with the system controller 118 to initiate launching of the setup along with the requested provisioning (block 212) and to start mediation and rating of the provisioned service. The dynamic load balancing module 116 then performs a dynamic load balancing operation to ensure that resource use per virtual machine does not exceed a predetermined threshold (block 214) based on the newly provisioned resources. In one embodiment of the invention, the dynamic load balancing process of block 214 is implemented using a load balancing method as illustrated in FIG. 3.

In particular, FIG. 3 shows pseudo code of a load balancing method 300 according to an embodiment of the invention. In general, the load balancing method 300 of FIG. 3 comprises a block of pseudo code 302 that describes a REPLACE_VM function, and a block of pseudo code 304 that utilizes the REPLACE_VM function as part of a load balancing process to shift extra load on a given virtual machine due to mediation and rating functions to another virtual machine. The block of pseudo code 304 implements the following process for each resource r that is monitored by the resource profiling module 114. The resources include CPU, memory, and other hardware/software resources that the virtual machines may utilizes when executing on a given computing node of the cloud computing platform.

For each resource r, a virtual machine list rl is generated, which includes a list of all virtual machines that currently use the given resource r, wherein the virtual machines in the list rl are sorted by the amount of usage (from highest to lowest) of the given resource r. In addition, a threshold value t is initialized for the given resource r. Then, for each virtual machine vm in the list rl for the given resource r, a current load cl on the virtual machine vm is determined. The current load cl of a given virtual machine vm corresponds to the resource usage of that virtual machine as specified in the list rl. If the current load cl of a given virtual machine vm for the given resource r is less than the threshold value t of the given resource r, the load on the virtual machine vm is not reassigned. On the other hand, if the current load cl on the given virtual machine vm for the given resource r meets or exceeds the threshold value t, then an extra load el is determined as the current load less the threshold (i.e., cl−t). Then, a REPLACE_VM function is called to determine if there is a virtual machine in the list rl that is capable of handing the extra load, and the parameters vm, el, and r are passed to the REPLACE_VM function.

The REPLACE_VM function begins by reading the virtual machine list rl and the threshold value t for the given resource r. The virtual machine list rl is inverted such that the virtual machines in the list rl are sorted from lowest to highest of the amount of usage of the given resource r. Then, for a given virtual machine uvm in the inverted list rl, the parameter ucl is set as the current load on the virtual machine uvm for the given resource r. If the sum of ucl and el is less than or equal to t for the given resource r, then the given virtual machine uvm is deemed a candidate for having at least the extra load el reassigned thereto from the given overloaded virtual machine vm (or, in an alternate embodiment, having the entire load associated with mediation and rating (M/R load) assigned from the overloaded virtual machine vm to a new virtual machine uvm). But first, the threshold is checked for the other resources to determine if the candidate virtual machine uvm would be able to handle the extra load el, or entire M/R load, without exceeding the threshold for the other resources. If it is determined that the given candidate virtual machine uvm can handle the extra load (or entire M/R load), then the candidate virtual machine uvm is selected as the target virtual machine (i.e., a parameter use_this_vm is set to the index of the candidate virtual machine uvm) to which at least the extra load el, or the entire M/R load, will be reassigned.

On the other hand, if the sum of cl and el (for the given virtual machine uvm) is greater than t, then a null value 0 is assigned to the parameter use_this_vm, and the process is repeated to find a candidate virtual machine uvm that is capable of handling at least the extra load el, or the entire M/R load, of the overloaded virtual machine vm. After all virtual machines uvm in the inverted list rl are processed, if the parameter use_this_vm is still equal to 0, then is it determined that no virtual machine uvm in the inverted list rl is capable of handling at least the extra load el of the overloaded virtual machine vm. In this circumstance, a new virtual machine is launched to handle the extra load el, or entire M/R load, of the overloaded virtual machine vm. Finally, the extra load el, or the entire M/R load, is transferred from the overloaded virtual machine vm to the newly instantiated virtual machine.

In other embodiments of the invention, methods are proved to reduce the cost of service management associated with price plans and to balance the benefits of a usage-based revenue scheme, with the cost for providing such usage-based revenue scheme. FIG. 2B illustrates further methods to provide scalable service management in a computing platform with regard to dynamically selecting mediation and rating techniques to provide cost awareness in a usage-based revenue scheme, according to an embodiment of the invention. The process flow of FIG. 2B is performed offline, and is based, in part, on processing results of the offline resource prediction module 108 in block 208 of FIG. 2A.

As shown in FIG. 2B, a first step includes selecting suitable metering, mediation and rating techniques based the predicted infrastructure and run-time resources needed for a new provisioning request (bock 216). In one embodiment of the invention, the resource profiling module 114 maintains information regarding a plurality of mediation and rating techniques, wherein such information comprises resource requirements for the various techniques. For example, FIG. 10 illustrates profile information that is used to determine resource requirements for different mediation and rating methods, according to an embodiment of the invention. In particular, FIG. 10 is a table that lists different mediation and rating techniques, and associated information such as CPU types, CPU utilization, RAM size, RAM utilization, distributed linear scaling, storage, licensing costs, management cost, IT infrastructure cost, volume (S/M/L), etc., and other types of information associated with the different mediation and rating techniques, which can be tracked and maintained based on historical profile data. In this regard, the mediation and rating methods used are elastic and linearly scalable. When a given metering, mediation and rating method are implemented, the system can estimate and track the cost associated with metering, mediation and rating (block 218). Then, various optimization methods can be utilized to maximize profit (block 220).

As previously mentioned, some customers may prefer to be charged on fine grain level. As such, service providers need to collect metering data at a finer grain level (e.g., collecting data on an hourly basis or daily basis is finer grained than collecting data on a monthly basis). In this regard, service providers would need more resources not only to collect data but also to process the data. Accordingly, in one embodiment of the invention, systems and methods are provide to predict the metering, mediation and rating costs for various combinations of meters and allow service providers to choose the best suitable combinations of metering, mediation and rating so that the service providers can offer their customers these combinations as available price plans. In one embodiment, services providers can dynamically recommend the most profitable price plans and associated revenue tools, with their scalable deployment, on one hand, based on the business trend for usage pricing and, on the other hand, based on the need for system management resources as new customers subscribe to the service.

FIG. 11 illustrates a method for maximizing profit for different services (e.g., IaaS, PaaS, SaaS). In particular, FIG. 11 shows a set of meters used for the different services and the metering and cost operations that are performed at different granularity levels (e.g., monthly, weekly, daily, hourly). When calculations are performed on a monthly level (once per month), there is less operational cost to the service provider, but such price plan may have lower competitive advantage (with less customers interested). In one embodiment, the cost of performing metering, mediation and rating is performed at all granularity levels. Then, to compare one price plan with another, a constant coefficient can be utilized for adjusting competitive advantage.

In general, embodiments of the invention provide a framework for dynamically optimizing the cost of a service metering solution by (i) using metering templates automatically populated with current cost data (infrastructure, management, SLAs etc.) learned over recent historical data, (ii) calculating the metering technique for each metered item in order to optimize the service over all profit (price–cost), (iii) updating the price plan accordingly such that the metered data calculated above is used in price line items, and (iv) deploying scalable parallelized charge calculation based on the selected prices and rating schemas. In this regard, embodiments of the invention include automated systems for (i) selecting metering techniques for each service solution priced item, (ii) collecting cost data in pre-defined templates and where metering templates are dynamically updated across clouds and applications, (iii) inputting prices based on marketing evaluations, (iv) calculating the metering techniques selection as an optimization formulation, (v) parallel rate calculation for scalable cloud charge calculation, and (vi) generating a business model including package, price plan, SLA, release based, and variable price (spot instances).

Experimental Setup and Results

We evaluated our framework on a test bed of 20 physical machines that were used to deploy 12 virtual machines within an OpenStack environment. Our analysis demonstrated that that service management related tasks can be offloaded to the existing virtual machines with at most 15% overhead in CPU utilization, 10% overhead for memory usage, and negligible overhead for I/O and network usage. By dynamically scaling the setup, we were able to significantly reduce the metering data processing time without incurring any additional cost.

More specifically, we implemented a fine-grained metering approach according to the general system framework of FIG. 1 on top of OpenStack and MongoDB, wherein Python code was written to implement various modules including the resource profiling module 114, the offline resource prediction module 108 and various controller modules (e.g., the system controller 118). In particular, we deployed OpenStack release Icehouse version 2014.1.1 on 20 physical machines, where each machine had six cores and 32 GB of RAM. We varied the number of virtual machines from 3 to 12 to provide a SaaS. The metering data was collected from the virtual machines using a variable sampling interval. We tracked the usage of the virtual machines for a period of one month. We launched both default as well as customized meters to collect the resource usage. The following Table I shows the specifications for each virtual machine used for the experimentation.

TABLE I

| CPU | RAM (GB) | Write BW (MB/s) | Read BW (MB/s) | NW (MB/s) |
|---|---|---|---|---|
| 8 Cores 3.0 GHz | 8 | 380 | 533 | 100 |

With regard to the scalable metering data store system 112, we performed tests using both a standalone as well as a scalable MongoDB setup. In our scalable setup, each replica set consisted of only one node that acted as a primary copy of the data. Furthermore, the replica sets were added as shards to scale the MongoDB deployment. For testing purposes, we launched three configuration servers and one query router that was deployed on the system controller VM 118. Each performance related experiment was performed on the actual collected metering data of more than 11 GB from the deployed OpenStack setup over the period of one month.

Figure 4:
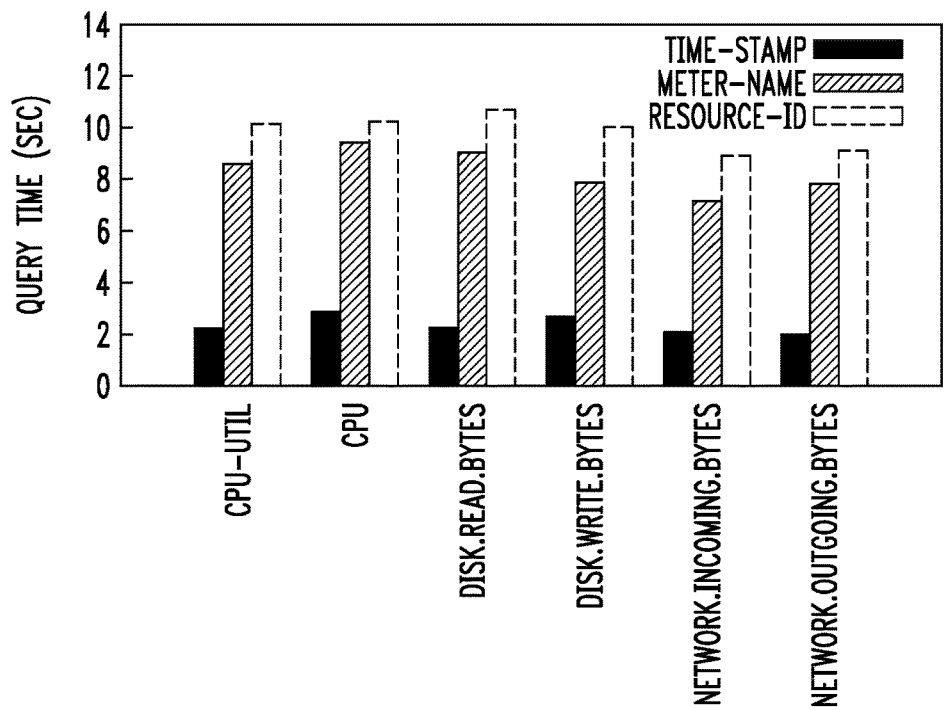
FIG. 4 graphically illustrates experimental results obtained for different metering events using different sharding keys on query times of an experimental metering data store system consisting of 4 shards, according to an embodiment of the invention.

With regard to sharding, we used different sharding keys for the Ceilometer database in our tests. FIG. 4 graphically illustrates experimental results obtained for different metering events from using different sharding keys on query timings for a MongoDB setup consisting of 4 shards. The metering events include cpu-util, cpu, disk.read.bytes, disk.write.bytes, network.incoming.bytes, and network.outgoing.bytes. The query calculated variance in utilization (standard deviation) of Ceilometer counters using MapReduce. From FIG. 4, it can be seen that the query time is affected more by the choice of the sharding key for the distributed setup as compared to the standalone setup.

Further investigation revealed that chunks greater than 64 MB were created in all cases except when timestamp of metering events was used as a shard key. This resulted in the MongoDB internal load balancer distributing chunks unevenly, with most of the chunks assigned to just one machine. This created a bottleneck and caused a significant increase in the query time. Consequently, a preferred sharding key to use in the target environment is timestamp, instead of counter name, user-id or resource-id.

Figure 5:
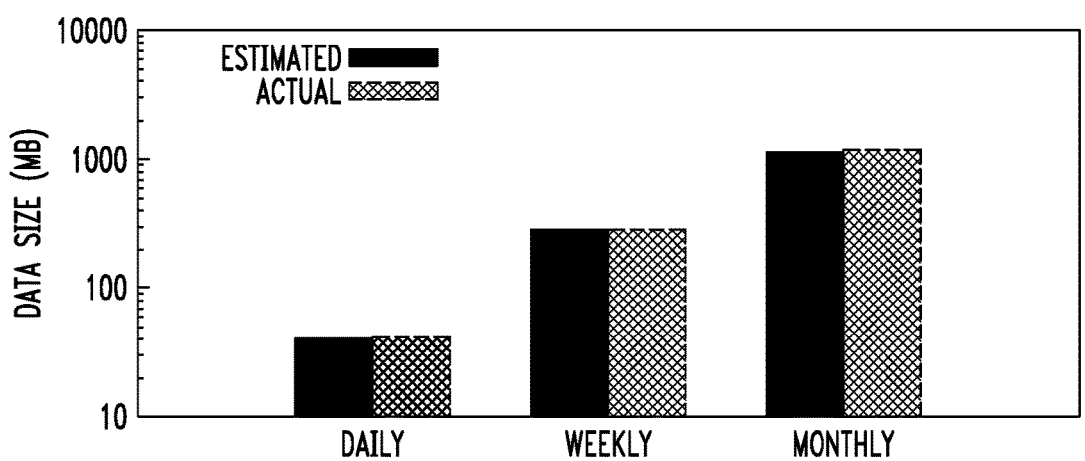
FIG. 5 graphically illustrates experimental results which show a comparison between an amount of metering data that was estimated using an experimental metering data size estimation module and an actual amount of collected metering data, according to an embodiment of the invention.

With regard to the functionality of the metering data size estimation, FIG. 5 graphically compares a data size of metering data estimated by the metering data size estimation module 106 and the actual collected metering data. In our first experiment, we compared the estimated and actual collected metering data size associated with the 12 virtual machines launched within the OpenStack deployment with a default set of meters. FIG. 5 shows the results. The framework predicted that 254 events would be collected from the virtual machine every 10 minutes. The estimated average event object size was 1150 bytes, 1134 bytes, and 1188 bytes for per day, per week and per month calculations, respectively. As seen in FIG. 5, compared to the actual observed values, the metering data size estimation module predicted metering data sizes with 99% accuracy.

Figure 6:
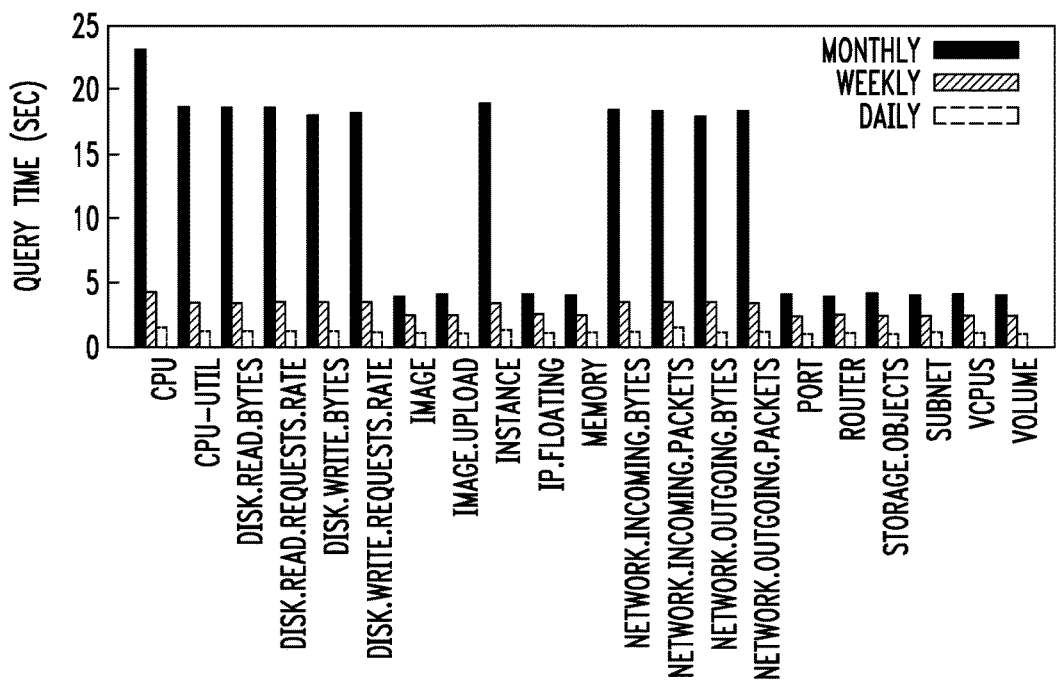
FIG. 6 graphically illustrates experimental results which show a comparison between query times at different granularity levels for various meters when processing user level data, according to an embodiment of the invention.

Next, with regard to resource profiling, we measured the effect of performing mediation at different granularity levels. FIG. 6 graphically illustrates experimental results of a comparison between query times at different granularity levels for various meters when processing user level data. The meters in FIG. 6 include cpu, cpu-util, disk.read.bytes, disk.read.requests.rate, disk.write.bytes, disk.write.requests.rate, image, image.upload, instance, ip.floating, memory, network.incoming.bytes, network.incoming.packets, network.outgoing.bytes, network.outgoing.packets, port, router, storage.objects, subnet, vcpus, and volume. FIG. 6 graphically illustrates the time taken to perform mediation on the data of a single user using the statistics API provided by Ceilometer. We measured Maximum, Minimum, Average, Sum, and Count for the considered meters at three different granularity levels, namely, daily, weekly, and monthly. The results reveal that the meters that collect samples continuously at a fixed sampling interval took 4× to 6× more time to perform mediation on one month's data compared to one week's data. A similar "linear scaling" trend was observed when we compared the mediation time taken to process one week of data and one day of data.

Figure 7:
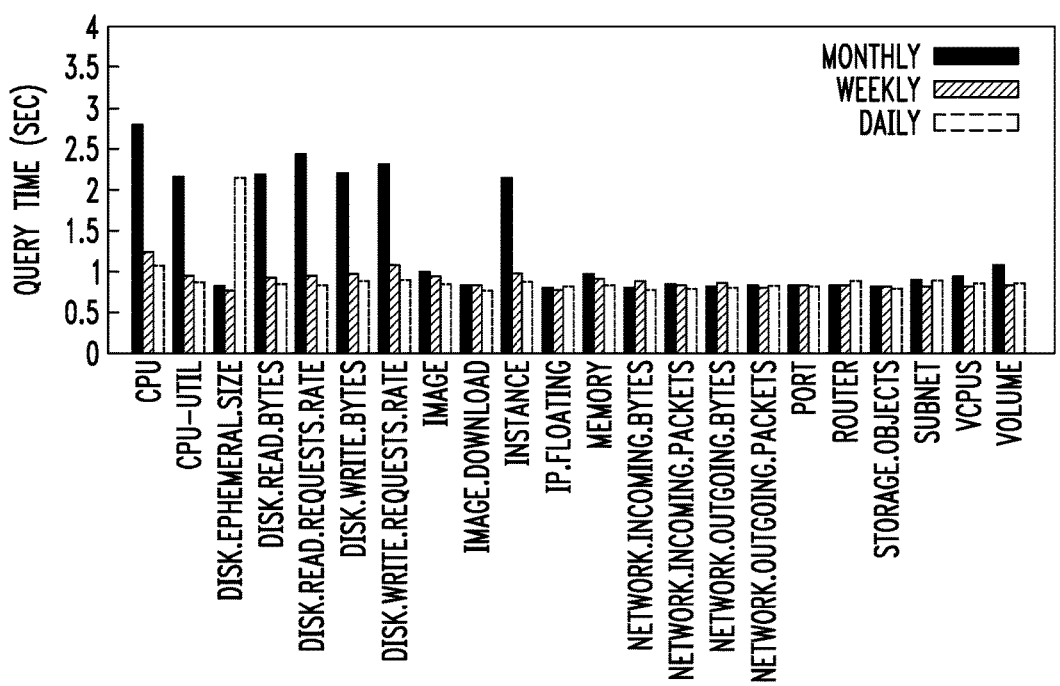
FIG. 7 graphically illustrates experimental results which show a comparison between query times at different granularity levels for the same meters in FIG. 6, when processing resource level data, according to an embodiment of the invention.

Next, we repeated the experiment using a single virtual machine under different metering data volumes. FIG. 7 graphically illustrates a difference in mediation time under different observed cases. In particular, FIG. 7 compares query times at different granularity levels for the same meters in FIG. 6, when processing resource (e.g., one virtual machine) level data. Once again, a linear scaling is observed for our approach.

Next, we measured the increase in average resource utilization per virtual machine due to mediation. The experimental results demonstrated that CPU utilization in the observed virtual machines did not increase above 15%. Similarly, an increase in memory utilization was observed to be less than 10%. Since the needed data is already distributed to the various virtual machines, the mediation process was expected to generate reads but not writes. This was confirmed by observed I/O usage, wherein the observed written data was substantially zero and wherein the average data read was low. Another key observation was that due to most of the computation being performed locally, the network usage was also negligible. The experimental results in this regard validate our claim that, if handled properly as in our approach, existing virtual machines can be used to perform mediation and rating tasks without affecting overall performance of the provided SaaS.

Figure 8:
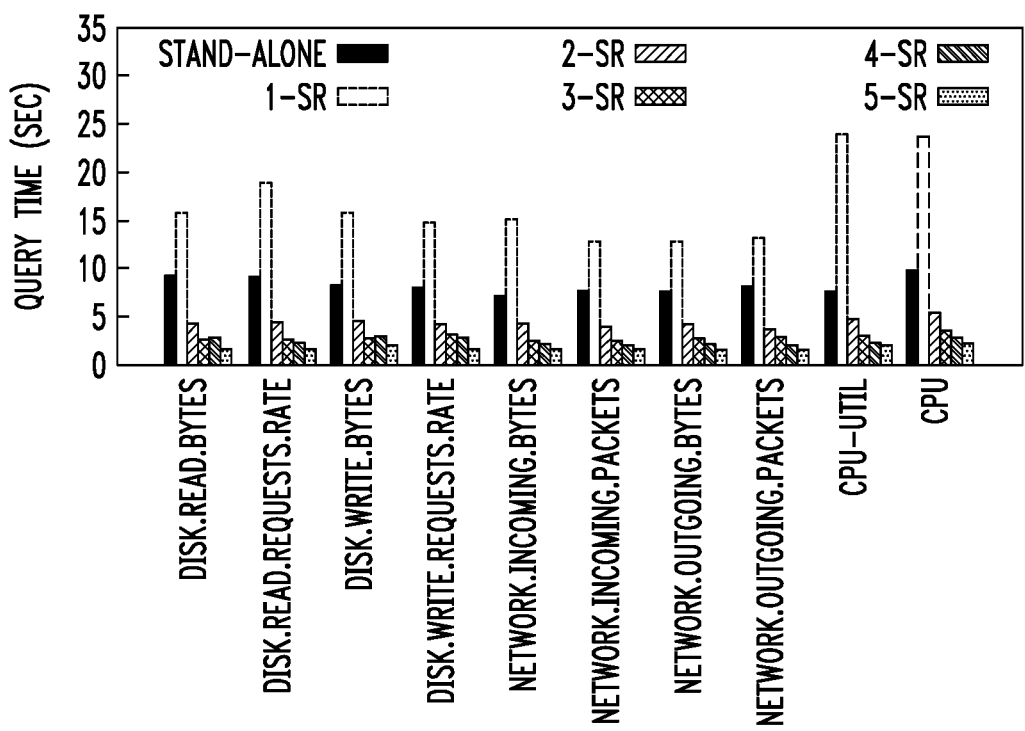
FIG. 8 graphically illustrates experimental results which show an impact on execution times of a query to calculate variance in utilization of various counters when scaling an experimental metering store, according to an embodiment of the invention.

With regard to the experimental scalable metering data store setup, we analyzed the effect of scaling our metering store, i.e., the distributed MongoDB setup, on mediation time. FIG. 8 graphically illustrates experimental results with regard the impact on execution time of a query to calculate variance in utilization of various counters as the metering store is scaled In particular, FIG. 8 illustrates a reduction in time to calculate variance in utilization (standard deviation) of various Ceilometer meters using MongoDB's MapReduce functionality, as we scaled up the metering store (the meters including disk.read.bytes, disk.read.requests.rate, disk.write.bytes, disk.write.requests.rate, network.incoming.bytes, network.incoming.packets, network.outgoing.bytes, betwork.outgoing.packets, cpu-util, and cpu). In FIG. 8, "sr" denotes a number of sharded replica sets used.

From FIG. 8, we see that the stand-alone installation of MongoDB performs better than the single shard distributed MongoDB setup—this is because of the networking overhead. However, as we increase the number of shards, the mediation time reduces. For the case of two replica sets acting as shards, the average query time is half the query time of the stand-alone setup. A further increase in the number of shards results in increasingly better performance in terms of query time. We also observed that the reduction in the query time is not linear and after reaching a certain threshold, the networking overhead actually causes performance degradation.

Figure 9:
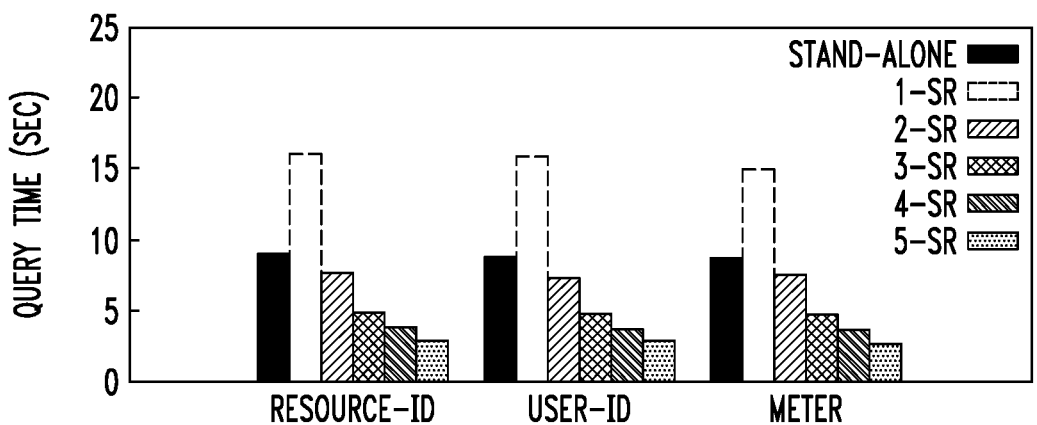
FIG. 9 graphically illustrates experimental results which show an impact of scaling of an experimental data metering store on query execution time when calculating Average, Sum, Maximum, and Minimum parameters using an aggregation function for different levels, according to an embodiment of the invention.

FIG. 9 graphically illustrates experimental results that show a comparison of query times to calculate Average, Sum, Maximum, and Minimum using an aggregation functionality provided by MongoDB. In particular, FIG. 9 shows the impact of scaling MongoDB on query execution time when calculating Average, Sum, Maximum, and Minimum using an aggregation for different levels, where "sr" represents a number of sharded replica sets used. Here, a more linear trend was observed when performing mediation using the aggregation.

Next, with regard to scaling and load balancing, we analyzed the effects of scaling the experimental setup and the role of load balancing. The following Table II shows the time taken to scale the metering store, total number of chunks transferred and chunks transferred per shard.

TABLE II

| Scaling from x to y Shards | Scaling Time (minutes) | Total Chunks Transferred | Chunks Transferred Per Shard |
|---|---|---|---|
| 1 to 2 | 10 | 93 | 93 |
| 2 to 3 | 6 | 62 | 31 |
| 3 to 4 | 3.5 | 47 | 15 |
| 4 to 5 | 2 | 37 | 9 |

By default, MongoDB only transfers one chunk at a time, which slows down the transferring process. The values shown in Table II illustrate that the transfer time should be taken into consideration when making setup scaling decisions. Furthermore, transferring chunks while scaling the setup also requires additional resources and adds an observable overhead to the virtual machines. This overhead was observed from the experimental results when scaling from one to five shards, in terms of resource usage per virtual machine for both a primary virtual machine i.e., the source of a chunk transfer, and a secondary virtual machine, i.e., destination of the chunk. We observed that while CPU utilization is high on the primary virtual machine, such utilization never exceeded 10% of that before the chunk transfer. Similarly, it was observed that memory utilization remained constant for the primary virtual machines, but increased by 5% to 10% for the secondary virtual machine compared to the pre-transfer usage.

It was further observed that the amount of data written in both the primary and secondary virtual machines remained almost unaffected, although high spikes of up to 2 MB/s were observed in the write I/Os. In contrast, the read I/O was observed to be higher for the primary virtual machine as compared to the secondary virtual machine. Moreover, the average write rate on the primary virtual machine was observed to be 0.5 MB/s whereas the average write rate for the secondary virtual machine was observed to be 0.4 MB/s. Similarly, the primary virtual machine showed a higher network transmission rate as compared to the secondary virtual machine which showed a higher reception rate. However, in both cases, the network transmission and reception rates stayed below 20 MB/s.

In summary, we have evaluated the performance of our approach in providing a scalable and flexible metering and rating system for cloud-based SaaS. Our results show that embodiments of systems and methods as described herein for scalable metering have small impact on the co-located SaaS while providing for dynamic scaling. The key features of our framework will allow cloud service providers to scale their revenue systems in a cost-aware manner. Our approach is designed for scalable deployment and is unique in that it uses existing VMs to perform service management operations (e.g., mediation and/or rating) for managing a cloud computing platform, and only launches additional VMs, when necessary, thus incurring little additional cost. Indeed, mechanisms are provided to profile and predict the resources required for supporting mediation and rating in cloud applications, for example, whereby we predict the additional load that can be added to the existing VMs that are already loaded. We perform load balancing by placing/shifting only a specific (small) part of the overall load to ensure compliance with SLAs. Our monitoring system collects and stores the metering data in distributed database, which implements the ability to scale the setup and use existing virtual machines, to provide a scalable and flexible metering and rating system for the SaaS applications in a cloud computing system, and provide a system for cloud service providers to scale their revenue management systems in a cost-aware manner.

Dynamic Metering Adjustment Techniques

As discussed above, the resource monitoring and metering system 110 of the service management system 102 provides an infrastructure to collect detailed measurements about managed resources of a computing platform, wherein resource usage measurements, CPU utilization, Disk Read Bytes, etc., are performed by meters or counters. Typically there is a meter for each resource being tracked, and there is a separate meter for each instance of the resource. Each data item collected by a meter is referred to as a "sample" or a "data sample", and each data sample comprises a timestamp to mark the time of collected data sample, and a volume that records a value of the data sample. The polling interval between two sampling events is, specified in a configuration filed (e.g., pipeline.yainl file), wherein the polling interval can be adjusted by a service provider according to certain requirements of the service provider. Once configured, the same polling interval is used to monitor all the instances launched in that particular system setup, unless the service provider manually changes the polling interval.

The frequency at which data samples are collected for a certain meter is called the "polling frequency" for that meter. In one embodiment, a service provider can manually configure the polling frequency for different types of meters. Once configured, the polling frequency for a given meter remains constant unless changed/updated manually. In this regard, the service provider can end up collecting large amounts of substantially similar samples often carrying, information of low significance about the usage or state of the tracked resource. This results in high storage volume and increased computational resource requirements to process all the collected data in view of, e.g., metering, incident, or problem management purposes, etc.

To illustrate these problems and potential solutions, consider the following example where the utilization of a certain resource remains relatively constant at a specific value for 5 hours. Assuming the polling frequency is one sample per second, a total of 18,000 samples is collected in 5 hours. From a metering point of view, however, since the data values remain relatively constant over this period of time, the same information could be inferred from data collected according to a polling frequency of one or a few samples per hour (as opposed to one sample per second). If this calculation is scaled to hundreds of metrics on thousands of VMs in a typical computing platform configuration, the problem increases by many folds.

To determine how common it is for resource utilization to remain unchanged in a typical cloud environment, we collected and analyzed data from 3359 virtual machines launched in geographically distributed IBM production servers (e.g., production servers in Asia Pacific, Africa, Australia, and Europe). The data was collected over a period of 3 months with a sample collected every 15 minutes.

To determine the variance of resource utilization, we calculated the mean of absolute rate of change, $\mu(t)$, for different monitored resources of randomly picked 338 VMs from all the regions. We analyzed two different kinds of meters: (i) meters used to directly monitor infrastructure usage such as CPU and memory utilization, and (ii) meters used to track the load imposed by VMs on the physical infrastructure such as a number of TCP/IP connections established by VMs, and pages accessed per second from disk. We first calculated the absolute value of the rate of change at time t in each resource usage (e.g., CPU utilization, memory utilization, number of TCP/IP connections, pages accessed from disk/sec. etc.), for each virtual machine, VMi, using the following equation:

$$\left|\frac{dRvm_i(t)}{dt}\right| = |Rvm_i(t) - Rvm_i(t-1)| \quad \text{Eqn. (1)}$$

Then, we computed an average across all VMs, based on the following equation:

$$\mu R(t) = \frac{\sum_{i=1}^{N} \left|\frac{dRvm_i(t)}{dt}\right|}{N} \quad \text{Eqn. (2)}$$

We computed $\mu_R(t)$ of the CPU and memory respectively for the last 8 days of our collection of data and found that over this period of time, the instantaneous variation of the resource usage to be less than 5%. We repeated this evaluation for other types of meters, e.g., number of TCP/IP connections and pages accessed/sec, and found the same trend for meter monitoring. This behavior holds true on average across the VMs and the 3 month of data samples that were collected. Overall we found less than 5% of VMs having sudden variation in the tracked resource utilization.

An additional observation is that for the 5% of VMs having sudden variation in resource utilization, the polling was not frequent enough to properly capture the evolution of the change. Hence, while decreasing the polling frequency can be beneficial for the majority of the VMs, it is also advantageous to identify those VMs that benefit from an increased polling frequency, as compared to a default polling frequency, in order to better capture the behavior of such VMs.

From our evaluation and experimental analysis, we have determined that the implementation of a tiering framework according to an embodiment of the invention, which is based on variation in resource utilization, is a solution that allows a service provider to monitor and collect data samples from each tier at a different polling frequency. For example, a tiering framework allows a service management system to utilize lower polling frequencies to monitor resources having less resource usage variation, for example. Consider a scenario where a given metric exhibits three (3) different types of behaviors across a set of VMs of a computing platform as follows: (i) high variance in utilization of a monitored resource; (ii) predictable or medium variance in utilization of the monitored resource; and (iii) low variance in utilization of the monitored resource. Currently, service providers are limited to monitor this resource by sampling the resource at one and the same polling frequency in all VMs, wherein the polling frequency would be selected to capture a predefined volume of changes in the utilization of that resource, e.g., 98%. This limitation in choice of the sampling frequencies leads to resources in the "low variance" tier to be over sampled as they are monitored at a too high of a polling frequency, whereas resources in the "high variance" tier are under sampled.

To further understand the characteristics of our data, we manually divided the VMs into three different tiers by calculating mean rate of change in resource utilization for each of the 338 VMs. We defined thresholds by dividing the range of the computed values between maximum and minimum values in three equal tiers for each of the four monitored resources (e.g., CPU utilization, memory utilization, number of TCP/IP connections, pages accessed from disk/sec). Following the levels of variance in $\mu R(t)$ of the four monitored resources, we found that for each of the meters used to track a corresponding one of the four monitored resources, more than 80% of the VMs fell within the tier with "low variance," 15% of the VMs fell within the tier with "medium variance," and 5% of the VMs fell within the tier with "high variance." Overall, our analysis demonstrated that in the case of un-tiered sampling, 80% of the resources were monitored at a polling frequency which was higher than the polling frequency needed to capture their changes, and that 5% of the resources were monitored at a polling frequency which was lower than the polling frequency needed to capture their changes.

In this regard, embodiments of the invention provide support for policy based data monitoring to enable custom, tier based polling frequencies. As explained in further detail below, a "monitoring policy" (or metric policy) defines sampling rules for a given metric profile. The ability to define metric profiles and associated differentiating metric policies takes into consideration the fact that different types of applications hosted by a given computing system may require different monitoring and data retention techniques. For instance, monitoring requirements for desktop clouds are different from monitoring requirements for HPC (high performance computing) applications or MapReduce jobs, for example. Similarly, the monitoring and data retention requirements for customer billing/charging are different from the monitoring and data retention requirements for checking the health of a computing system. In this regard, embodiments of the invention take into consideration that metrics with higher (or lower) monitoring data resolution requirements should having configurable profiles to specify, e.g., that the monitoring data associated with a given metric is critical (or not critical), and thereby allow conservative (or not conservative) sampling and data retention (e.g., storage) policies to be associated with the metrics. Another advantage of policy based sampling is that it enables service providers to separate those resources for which prompt anomaly detection is required.

Furthermore, embodiments of the invention take into consideration that the target usage of monitoring data can dictate what monitoring data needs to be collected and how the monitoring data is collected. In this regard, techniques are provided to enable the customization of metric profiles by allowing service providers to characterize each metric in terms of, e.g., (i) what the metric is used for (e.g., used for charging customers as part of the usage based price definition, used for health check etc.), (ii) the importance of the metric in the inventory (e.g., belongs to VM hosting critical or non-critical applications), (iii) the precedence of the metric in the application flows (e.g., belongs to a leaf or root item in the dependency graph), or in terms of (iv) the dependence of the metric on other metrics (e.g., independent or correlated metric).

As explained in further detail below, these criteria, while extendable, represent one embodiment of a set of configuration items that can be used to define a metric profile. Based on the metric profile, each metric is associated a metric policy. In addition, as explained in further detail below, a polling policy can be as simple as collecting and storing only the data from the last hour, day or even week initially at full granularity and then aggregate the data over time, or a polling policy can be as complex as collecting and storing the data, and then analyzing the data to fine tune how to capture and store data for a given metric in a more efficient way.

FIGS. 12, 13, 14, 15, and 16 collectively illustrate techniques for dynamically adjusting metering operations for service management of a computing platform, according to embodiments of the invention. As explained in further detail hereafter, such techniques enable service providers to customize their service management monitoring systems for policy based data monitoring such that each tier of system metrics with similar monitoring data behavior and business needs can have the VMs of that tier monitored according to the same dedicated polling policy, different from the other tiers.

Figure 12:
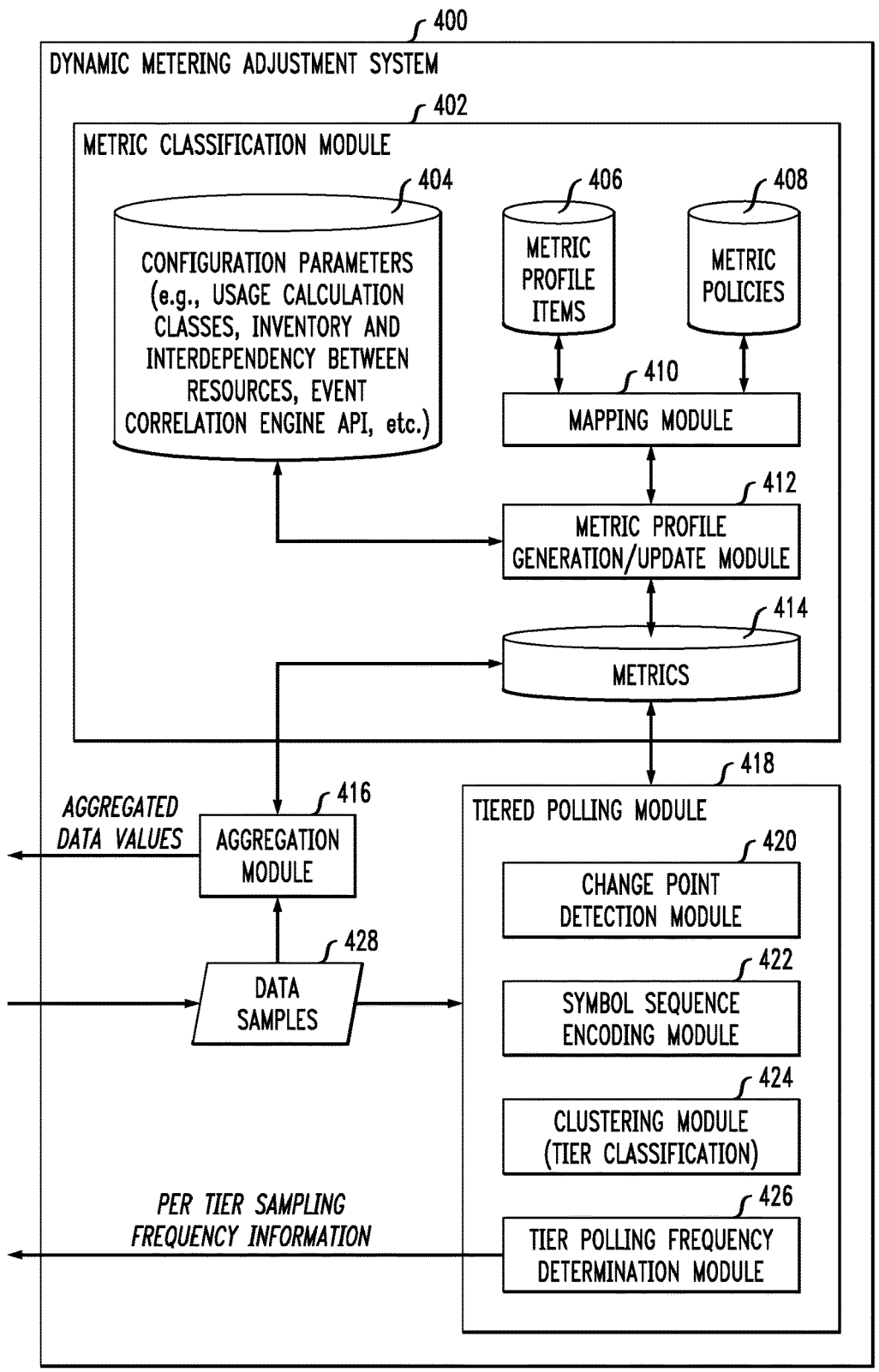
FIG. 12 illustrates a system for dynamically adjusting metering operations for service management of a computing platform, according to an embodiment of the invention.

FIG. 12 illustrates a system for dynamically adjusting metering operations for service management of a computing platform, according to an embodiment of the invention. In particular, FIG. 12 shows a dynamic metering adjustment system 400 comprising a metric classification module 402, which comprises a data store of configuration parameters 404, a data store of metric profile items 406, a data store of metric policies 408, a mapping module 410, a metric profile generation/update module 412, and a data store of defined metrics 414. The dynamic metering adjustment system 400 further comprises an aggregation module 416 and a tiered polling module 418, which comprises a change point detection module 420, a symbol sequence encoding module 422, a clustering module 424, and a tier polling frequency determination module 426.

In one embodiment of the invention, the dynamic metering adjustment system 400 is a separate module that is included in the service management system 102 of FIG. 1. In alternate embodiments, the constituent components of the dynamic metering adjustment system 400 shown in FIG. 12 may be incorporated in the metering data size estimation module 106 or the resource monitoring and metering system 110, or the constituent components of the dynamic metering adjustment system 400 can be distributed across the different modules (e.g., modules 106 and 110) of the service management system 102 of FIG. 1.

The metric classification module 402 is configured to define metric profiles for various system metrics and assign associated metric policies (e.g., polling and storage policies) to the metric profiles. More specifically, the configuration parameters 404 comprise configuration items that are specified by a service provider of a given computing platform, and which are utilized by the metric profile generation and update module 412 to generate or update target metrics that used for service management in the given computing platform. The configuration parameters 404 include items such as: (i) REST URLs of usage calculation classes for usage based pricing, wherein such usage calculation classes typically calculate the transformation of raw metered data into a charged unit of measure, or the maximum or sum of metered values, or more complex metric aggregations, for example; (ii) inventory and interdependencies between servers, applications, network devices, software, configuration files, operating systems and other IT infrastructure components expressed as graphs, xml files or spreadsheets; and (iii) event correlation engine API, etc.

The data store of metric profile items 406 comprises service provider-defined metric profile configuration items that are used to define and classify metric profiles. The data store of metric policies 408 comprises service provider-defined metric policies that define different classes of polling policies and/or data storage policies. The mapping module 410 is configured to create a mapping data structure which maps metric profile items 406 and metric policies 408.

For example, FIG. 13 illustrates a method for mapping metric profiles to metric policies according to an embodiment of the invention. In particular, FIG. 13 shows a mapping table 500 in which metric profile items 502 are mapped to metric policies 504. As shown in FIG. 13, the metric profile items include configuration items such as (i) Critical, (ii) Dependency Root, (iii) Usage Based Charging, and (iv) Independent Metric. The metric profile items 502 comprises a set of items that are used to define and classify metric profiles (although other types of configuration items may be utilized depending on the application).

For instance, the "Critical" profile item is a parameter that specifies whether or not a given metric is critical in terms of its importance in the system (e.g., whether the given metric is associated with a VM that hosts a critical or non-critical application). Next, the "Dependency Root" profile item is a parameter that specifies whether or not a given metric is associated with a root node (as compared to a leaf node) in a dependency graph that defines an application flow, for example. In another embodiment, a similar profile item may be defined to specify a given metric in terms of its precedence in an application flow. Further, the "Usage Based Charging" profile item specifies whether or not a given metric is utilized for charging a customer as part of usage based charging policy. In another embodiment, a similar profile item may be defined to specify whether or not a given metric is utilized for a system health check, for example. Next, the "Independent Metric" profile item is a parameter that specifies whether or not a given metric depends on one or more other metrics (e.g., whether the given metric is independent from or correlated with another metric).

As further shown in FIG. 13, the metric policies 504 comprise various combinations of polling policies and data sample storage policies such as (i) a conservative sampling and conservative storage policy, (ii) a conservative sampling and aggregated storage policy, (iii) a per tier sampling and conservative storage policy, and (iv) a per tier sampling and aggregated storage policy. A conservative sampling policy for a given metric specifies the use of a default polling frequency (with a high frequency sampling rate) to be applied by the monitoring system (e.g., the resource monitoring and metering system 110, FIG. 1) for collecting data samples associated with the given metric. Similarly, a conservative storage policy for a given metric indicates that all collected data samples for the given metric are recorded/stored.

Moreover, a per tier sampling policy for a given metric indicates the use of a reduced polling frequency (with a sampling rate less than the default high frequency sample rate) to be applied by the monitoring system for collecting data samples associated with the given metric, wherein the reduced sampling frequency in a given tier is determined based on a behavior of metrics within the given tier. Further, an aggregated storage policy for a given metric specifies the use of a corresponding aggregation rule to aggregate the data samples (e.g., keeping an independent metric only in case of correlated metrics, or computing one or more aggregated values (e.g., SUM) as indicated by the usage calculation class(es) for a metered metric, etc.), and then only recording/storing the aggregate of the data samples (e.g., storing an aggregated value computed from a portion of the collected data samples).

As further shown in FIG. 13, the metric policies 504 are mapped to a given metric depending on the values of the metric profile items of the given metric. For example, a metric that is deemed critical is assigned a conservative sampling and conservative storage policy, irrespective of the values of the other metric profile items. Further, a metric that is not deemed critical, but which is associated with a root item in a dependency graph is assigned a conservative sampling and conservative storage policy, irrespective of its use or dependency. Moreover, a metric that is not deemed critical and not associated with a root item, but which is utilized for usage based charging, is assigned a conservative sampling and aggregated storage policy, irrespective of its dependency. Next, a metric that is not deemed critical, not associated with a root item, and not utilized for usage based charging, but which is deemed an independent metric, is assigned a per tier sampling and conservative storage policy. Finally, as shown in FIG. 13, a metric that is not deemed critical, not associated with a root item, not utilized for usage based charging, and not an independent metric, is assigned a per tier sampling and aggregated storage policy.

The mapping 500 between the metric profile items and the sampling and storage policies as shown in FIG. 13, for example, is generated and maintained manually by the service provider using the mapping module 410 shown in FIG. 12. The metric profile generation and update module 412 programmatically and periodically accesses current mapping information (maintained by the mapping module 410) and the data store of configuration parameters 404 to automatically generate, populate or otherwise update metric profiles of system metrics. In particular, for a newly defined metric with specified values for the metric profile items 502 (as determined/defined according to the configuration parameters 404, for example), the metric profile generation and update module 412 will access the mapping module 410 to determine the proper sampling and/or storage policies to assigned to the given metric based on the values of the metric profile items for the given metric. Similarly, when one or more values of metric profile items of an existing metric are change/updated, the metric profile generation and update module 412 will access the mapping module 410 to determine if the currently assigned sampling and/or storage policies are still appropriate, or need to be changed, based on the changed/updated value(s) of the metric profile items for the given metric. The defined metrics and associated metric policies are maintained in the data store of metrics 414.

The aggregation module 416 is configured to apply one or more aggregation rules to aggregate collected data samples 428 that are associated with a given metric having an assigned metric policy that specifies aggregated storage. The aggregation module 416 generates and outputs aggregated data values to be stored in, e.g., the scalable metering data storage system 112 of FIG. 1. The tiered polling module 418 is configured to receive and process data samples 428 associated with metrics having an assigned policy of "per tier sampling" to partition the metrics into different tiers having different polling frequencies.

More specifically, in one embodiment of the invention, the change point detection module 420 implements a change point detection (CPD) algorithm to process a time series of data samples for a given metric to identify the number and timing of the changes that occur in the collected data samples for the given metric. For example, in one embodiment of the invention, the change point detection module 420 implements methods as disclosed in the article by M. Agarwal, et al, entitled, *"Problem Determination in Enterprise Middleware Systems using Change Point Correlation of Time Series Data,"* in Network Operations and Management Symposium, 2006, 10th IEEE/IFIP, pp. 471-482, April 2006, which is incorporated herein by reference. Other change point detection techniques may be implemented.

The symbol sequence encoding module 422 processes change point time series data for a metric, which is output from the change point detection module 420, to convert the change point time series data into a discrete format of a sequence of symbols with a small alphabet size, which encodes the change behavior of the given metric. In one embodiment of the invention, the symbol sequence encoding module 422 implements symbolic aggregate approximation methods as disclosed in the article by J. Lin, et al, entitled *"Experiencing SAX: A Novel Symbolic Representation Of Time Series,"* Data Mining and Knowledge Discovery, October 2007, Volume 15, Issue 2, pp. 107-144, which is incorporated herein by reference. Other suitable encoding techniques can be implemented.

The clustering module 424 is configured to process the symbol sequences output from the symbol sequence encoding module 422 and cluster the symbol segments generated into tiers of metrics with similar sequences, and filter out of the tiers all the metrics with segments scattered in different clusters. In one embodiment of the invention, the clustering module 424 implements the structural similarity techniques disclosed in the article by P. Siirtola, et al., entitled "*Improving The Classification Accuracy of Streaming Data Using SAX Similarity Features*," Pattern Recognition Letters, 32(13):1659-1668, 2011, which is incorporated herein by reference, in addition to the techniques disclosed in above noted article by J. Lin, et al. Furthermore, as explained below, the tier polling frequency determination module 226 is configured to utilize the clustering results to determine different polling frequencies for different tiers based on common sequences of symbols of the metrics associated with the different tiers.

Figure 14:
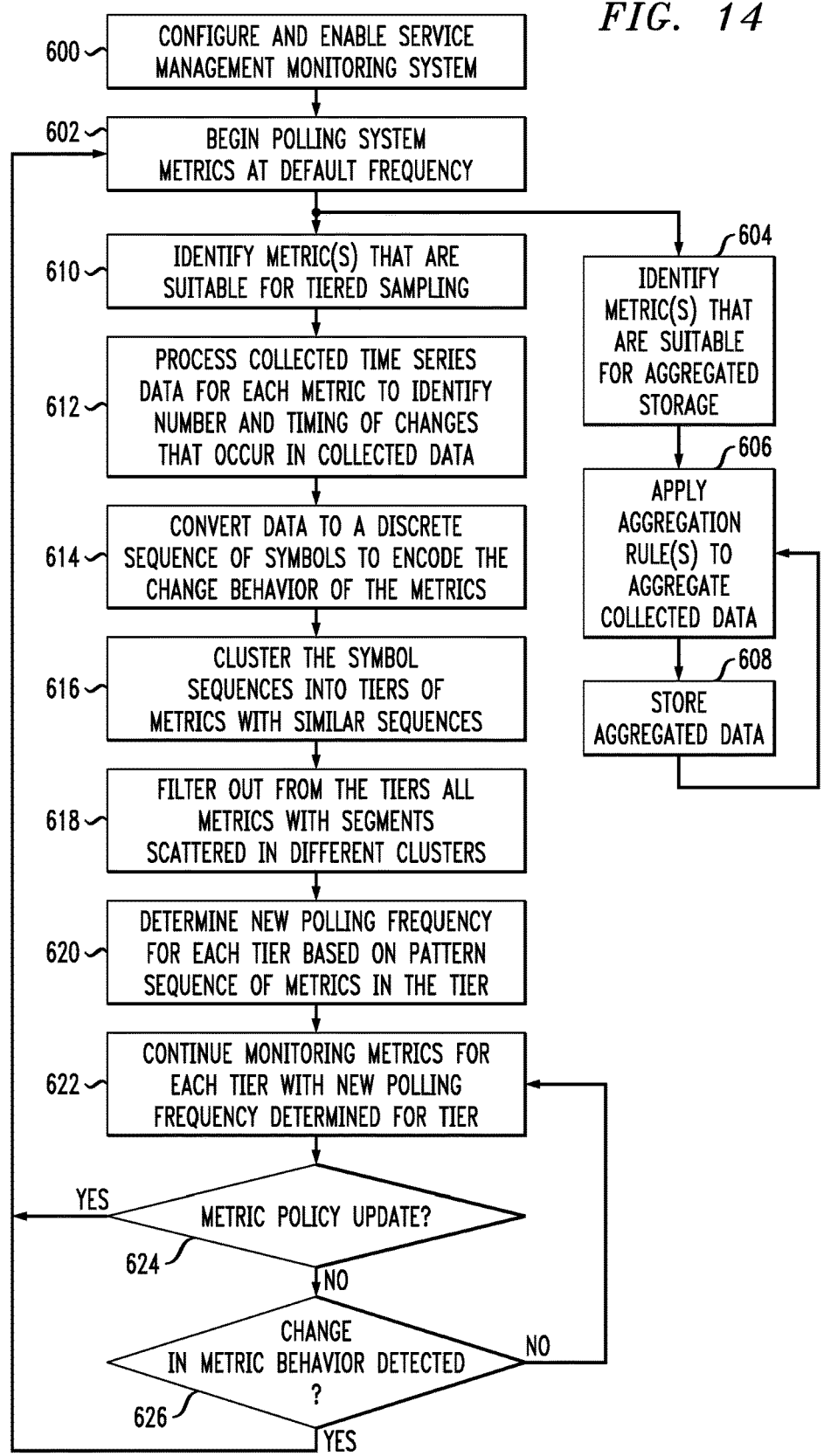
FIG. 14 is a flow diagram of a method for dynamically adjusting metering operations for service management of a computing platform, according to an embodiment of the invention.

FIG. 14 is a flow diagram of a method for dynamically adjusting metering operations for service management of a computing platform, according to an embodiment of the invention. In particular, FIG. 14 illustrates operational modes of the dynamic metering adjustment system 400 of FIG. 12. In this regard, the process flow of FIG. 14 will be discussed in further detail with reference to constituent components of the system of FIG. 12. Referring to FIG. 14, an initial process comprises configuring and enabling the service management monitoring system (block 600). This process comprises, for example, defining system metrics and assigning metric policies to the metrics using the metric classification module 402. as discussed above. Once configured and enabled, the service management monitoring system begins polling the system metrics initially at a predefined, default sampling frequency, and collecting data samples associated with the metrics (block 602).

Next, the dynamic metering and adjustment system 400 will access the data store of metrics 414 to identify metrics that have been assigned a metric policy of "aggregated storage" (block 604). The data samples that are associated with the metrics having an aggregated storage policy are processed by the aggregation module 416 by applying appropriate aggregation rules to aggregate the collected data samples (block 606). For instance, for a given metric that is characterized as being correlated to another metric (i.e., not independent), each new data sample of the given metric is compared to a last stored data sample of the given metric, and the new data sample is stored in the metering database only if the value of the new sample is different from the value of the last stored data sample. As another example, the data samples for a given metric that is utilized for usage-based charging will be processed according to a specified usage calculation logic (e.g., sum, max, min) and the result will update the current value without creating a new entry in the database. Other aggregation rules can be applied to aggregate data samples of various metrics, depending on the application.

Furthermore, the dynamic metering and adjustment system 400 will access the data store of metrics 414 to identify metrics that have been assigned a metric policy of "per tier sampling" (block 610). Each data sample collected from the computing platform for a given metric is a data point in a time series of data for that metric on a given configuration item. After a sufficient amount of data samples are collected for the metrics (e.g., for a few weeks), a the change point detection module 420 processes the time series data for each of the metrics using a CPD process to identify the number and timing of the changes that occur in the data sample streams of the metrics (block 612).

Figure 15:
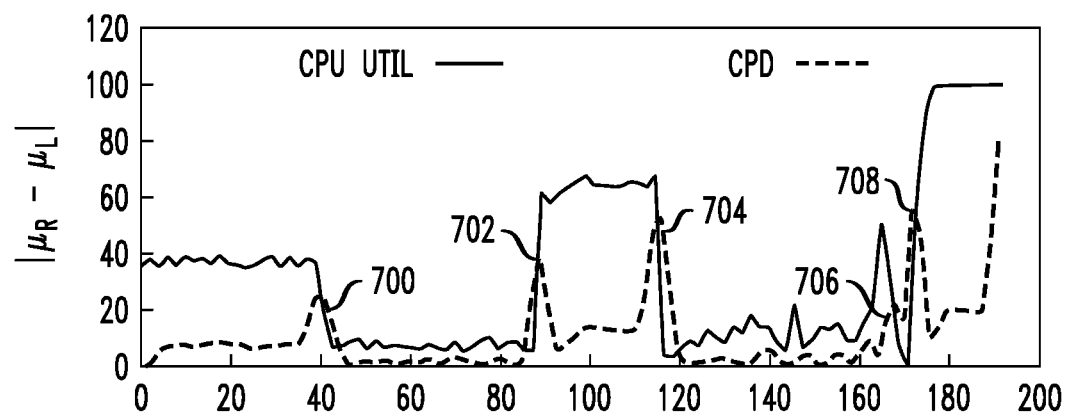
FIG. 15 graphically illustrates a method for detecting changes in time series data samples that are collected for a given metric, according to an embodiment of the invention.

For example, FIG. 15 graphically illustrates a method for detecting changes in a time series of data samples that are collected for a given metric, according to an embodiment of the invention. In particular, FIG. 15 shows an example of CPD applied to collected data samples associated with CPU utilization of a VM over a period of two days to generate change point time series data. As shown in FIG. 15, a solid line shows the CPU utilization over the given time period, and a dashed line shows results of the CPD analysis. The CPD results are in the form of a change point time series data having spikes 700, 702, 704, 706, and 708 at times where there are significant changes (increase or decrease) in CPU utilization over the given time period of collected data samples.

More specifically, the CPU utilization in FIG. 15 represents a variance of the CPU utilization, and the CPD process is implemented determine time instances where there are abrupt changes (e.g., spikes 700, 702, 704, 706, and 708) in the variance of the CPU utilization. The X-axis in FIG. 15 represents time intervals of 15 minutes (there are 2880 minutes in two days, wherein 2880/15 is 192). The Y-axis represents values of the CPD time series computed as $|\mu_R - \mu_L|$, which denotes an absolute value of a difference between (i) a mean of a set of points to the right of a given data point (of CPU utilization) and (ii) a mean of a set of points to the left of the given data point. In other words, to compute the CPD time series data, for each selected point of the CPU utilization time series data shown in FIG. 15, the mean of a set of points to the right of the selected point is computed ($\mu_R$), the mean of a set of points to the left of the selected point is computed ($\mu_L$), and an absolute value of the difference between the computed means, $\mu_R - \mu_L$, is computed as the CPD value for the selected point. The "set of points" that are chosen is referred to as a window size. In one embodiment, the window size is 3 or 5 points.

Next, the change point time series data (or CPD time series data) for each metric is converted to a discrete sequence of symbols to encode the change behavior of the metrics (block 614). As noted above, in one embodiment of the invention, this process is performed by the symbol sequence encoding module 422 using an SAA (symbolic aggregate approximation) process on the CPD time series data to convert the CPD time series data into a discrete format of a sequence of symbols with a small alphabet size. For example, FIG. 16 graphically illustrates a method for encoding a change point time series into a symbol sequence, according to an embodiment of the invention.

Figure 16:
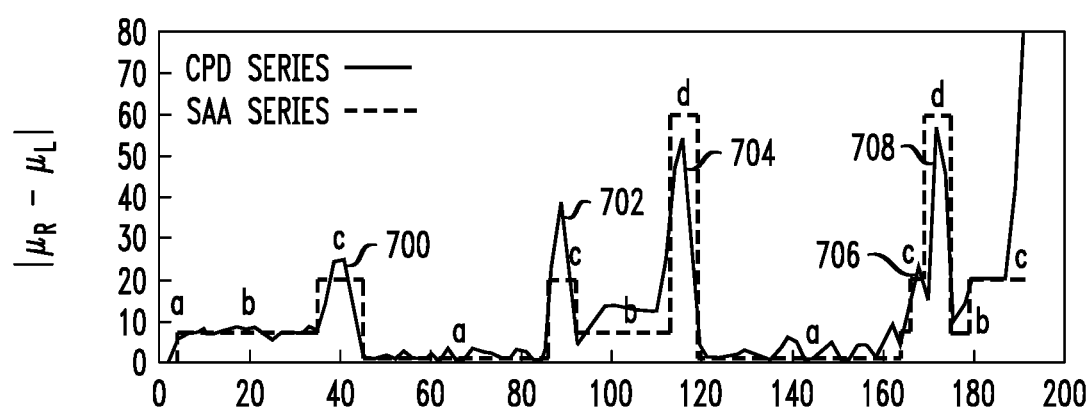
FIG. 16 graphically illustrates a method for encoding a change point time series into a symbol sequence, according to an embodiment of the invention.

In particular, FIG. 16 shows the CPD time series data (solid line) with spikes 700, 702, 704, 706, and 708 (as in FIG. 15), along with an associated SAA time series data (dashed lines) with different segments of the SAA time series data labeled with letters to provide a letter string, e.g., "abcacbdacdbc" in the given example. The letter string is configured to encode the change behavior of the metrics that are selected for tiered sampling. In the example of FIG. 16, one symbol "a" corresponds to flat, monotone segments of invariable behavior, while other symbols "b", "c," and "d" correspond to times when the metric has changed. In one embodiment, these symbols are considered to represent different tiers in which different sampling frequencies are applied to capture relevant information.

In particular, the results of the CPD and SAA analysis enable the dynamic metering adjustment system 400 to monitor and detect the behavior of the system metrics over time, and to adjust sampling frequencies at different times based on the metric behavior. For example, we are interested in collecting precise data around the timing of change occurrences in time series data, which correspond to changes in statistical properties of the metrics, while collecting samples during monotone stretches of consecutive identical symbols is of less interest. When certain segments of unchanged performance remain relatively constant for many hours, it is unnecessary to poll and store data samples at intervals of 1 to 5 seconds, rather, only a few samples need to be collected during those segments of unchanged performance.

Following the symbol encoding process, the symbol sequences that generated for the system metrics are clustered into different tiers of metrics having similar symbol sequences (block 616). This process takes into consideration that large groups of metrics have similar change point time series data, with spikes corresponding to seasonal periods of the day and days of the week and weekend. Therefore, in one embodiment of the invention, to reduce a number of metric policies to maintain, the sequences are divided into segments corresponding to weekly periods (e.g., Monday to Sunday) and the segments are grouped (clustered) into different tiers of metrics. In one embodiment of the invention, this process is implemented by the clustering module 424 (FIG. 12) using the SAA process to cluster the symbol segments generated above into different tiers of metrics with similar sequences. For example, a metric having all its weekly segments in one group indicates that its weekly pattern is stable across the analyzed weeks.

A next step in the process includes filtering out from the tiers all metrics which have segments that are scattered in different clusters (block 618). Then, for each tier, a new polling (sampling) frequency is determined for the remaining metrics in that tier based on the weekly sequence of symbols of the metrics in that tier. For example, in one embodiment of the invention, a new polling frequency for a given tier is determined as follows: (1) for each isolated occurrence of a spike symbol in any metric segment, data is collected from the timing of the beginning of the spike until the end of the spike (e.g., every second during a minute), and (2) for the segments with unchanged performance, data is collected hourly only if no isolated spike has already triggered data collection during that hour.

The signature of the polling timing identified in each tier represents the data sampling metric policy of that tier. As these data sampling metric policies are made available to the service management system 102 (FIG. 1), the service management monitoring system can switch from the default data sampling metric policy to the new polling frequencies (block 622) and start making an efficient usage of storage and computational resources. For example, the tiered polling module 418 can output the per tier sampling frequency information to the resource monitoring and metering system module 110, wherein the module 110 applies the newly determined per tier data sampling frequencies to monitor and collect data samples for the associated system metrics.

During run-time, as metric behaviors or monitoring policies evolve over time, the classification of a given metric in a particular tier may become unsuitable for the new sampling and storage requirements. For example, a metric policy update for a given metric (affirmative result in block 624) will directly trigger a reclassification of the given metric into the default, full sampling tier (return to block 602), where the metric classification process (e.g., blocks 610-620) will be re-applied.

Similarly, when a change in behavior of given metric is detected (affirmative determination in block 626), the given metric is automatically reclassified into the default, full sampling tier (return to block 602), and the metric classification process is re-applied. However, a change in metric behavior update is not directly signaled unless it is monitored. In this regard, in one embodiment of the invention, a change in metric behavior of a given metric can be detected by comparing data samples collected (as per the tier based sampling) for the given metric to the most recent average of the past collected values corresponding to the metric's sequence symbol generated by the SAA process for that particular time in the sequence. If the difference is greater than a predefined threshold (e.g., 10%), the metric is assigned to the default, conservative sampling tier, for reclassification. In one embodiment of the invention, we determine and utilize in the metric profile those configuration items that have a reduced sensitivity to the changes in the monitored environment, and hence a limited potential of causing the metrics to oscillate between the tiers.

Experimental Results

To evaluate the efficacy of dynamic metering adjustment techniques according to embodiments of the invention as described above, we used Python and The R Project for Statistical Computing to analyze the data (as mentioned above) that was collected from IBM production servers over a period of 3 months. For evaluation purposes we compared default or conservative sampling and storage with tiered sampling and aggregated storage. The policies discussed above (FIG. 13) were defined based on two procedures, one aggressive and the other non-aggressive.

In the aggressive approach, we set a higher threshold for aggregated storage, and aggressively reduced the polling frequency when collecting monitoring data from tiers with low variance in the resource utilization. For each policy, we measured the reduction in the collected data size, as well as the missed anomaly detection rate. The missed anomaly detection rate was calculated by comparing the data collected for each policy with the anomalies found by examining system logs collected for the same time period using sysstat utilities. The sysstat data was collected at a frequency two times (2×) the maximum polling frequency used to collect the monitoring samples. We defined an "anomaly" as a missed sample having a sudden increase or decrease in utilization as compared to its adjacent samples. Furthermore, for the policies involving metered data, we applied a rule that we store enough samples so that metering tasks can be successfully performed in following revenue calculation stages.

The evaluation results using actual data from IBM production servers reveals that it is possible to reduce the monitoring data size up to 80%, as well as decrease the missed anomaly detection rate from 3% to as low as 0.05% to 0.1%, as shown in the following table:

| | Data Reduction | | |
|---|---|---|---|
| Policy | Non Aggressive | Aggressive | Miss Detecion Rate |
| Cons__Sam + Cons__Stor | 0% | 0% | 3% |
| Cons__Sam + Aggr__Stor | 61.17% | 70.17% | 3% |
| Tier__Sam + Cons__Stor | 72.7% | 76.8% | 0.05-0.1% |
| Tier__Sam + Aggr__Stor | 76.32% | 80.04% | 0.05-0.1% |

In particular, the results of our evaluation demonstrated that by storing aggregated data instead of conservatively storing all samples, we obtained a 60% to 70% reduction in data collected for monitoring purpose. The decrease in data size was due to storing only samples which either conveyed useful information about the current health of the monitored resource or were required for charging purposes. The missed anomaly detection rate for conservative sampling was found to be 3% as the default polling frequency was not high enough to track the changes in VMs having sudden variations in resource utilization.

Next, when tiered sampling was enabled with conservative storage (storing every sample), we were able to reduce the data size by 72% to 76% whereas the missed anomaly detection rate was found to be only 0.05% to 0.1% due to higher polling frequency used for the set of VMs having sudden variations in resource utilization. Further evaluation revealed that 99.99% of the anomalies were from the tier for which reduced the polling frequency was used. Hence, the missed anomaly detection rate can be further reduced by using a less aggressive approach.

Finally, when applying both tiered sampling and aggregated storage, we obtained up to 80% reduction in data size. The missed anomaly detection rate remained the same as in the case of tiered sampling with conservative storage, since shifting from conservative to aggregated storage without changing the sampling policy does not affect the anomaly detection.

We estimated the storage savings by considering an average object size of a sample of 1024 bytes. This size is due to the information related the resource usage plus the additional fields, e.g., instance id, timestamp, resource id, user id, project id, etc. If a single VM produces 100 counters per second and storage costs $0.07 per GB, then a rough estimate of savings for an environment of 1000 VM, per year can be calculated as follows: 0.8×$0.07 per GB/month×100 samples/sec×1024 bytes×60 sec/min×60 min/hour×24 hours/day×30 days/month/10^9 bytes/GB=$14.864/VM/month×1000 VMs=$14,864/environment/month, which accumulated over one year results in a saving of $1,159,392/environment/year. The amount of stored data increases each month and can be represented by an arithmetic progression. Hence, n (a1+an) 2 was used to calculate the cost accumulated over period of 12 months.

It is to be noted that in some cases (e.g. metering data for charging) service providers are bound by an SLA to maintain customer data for as long as 3 to 5 years. Therefore, monitoring and metering methods as described herein are beneficial to both tenant (for the savings) and the service provider (for the competitive advantage).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 17, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 17:
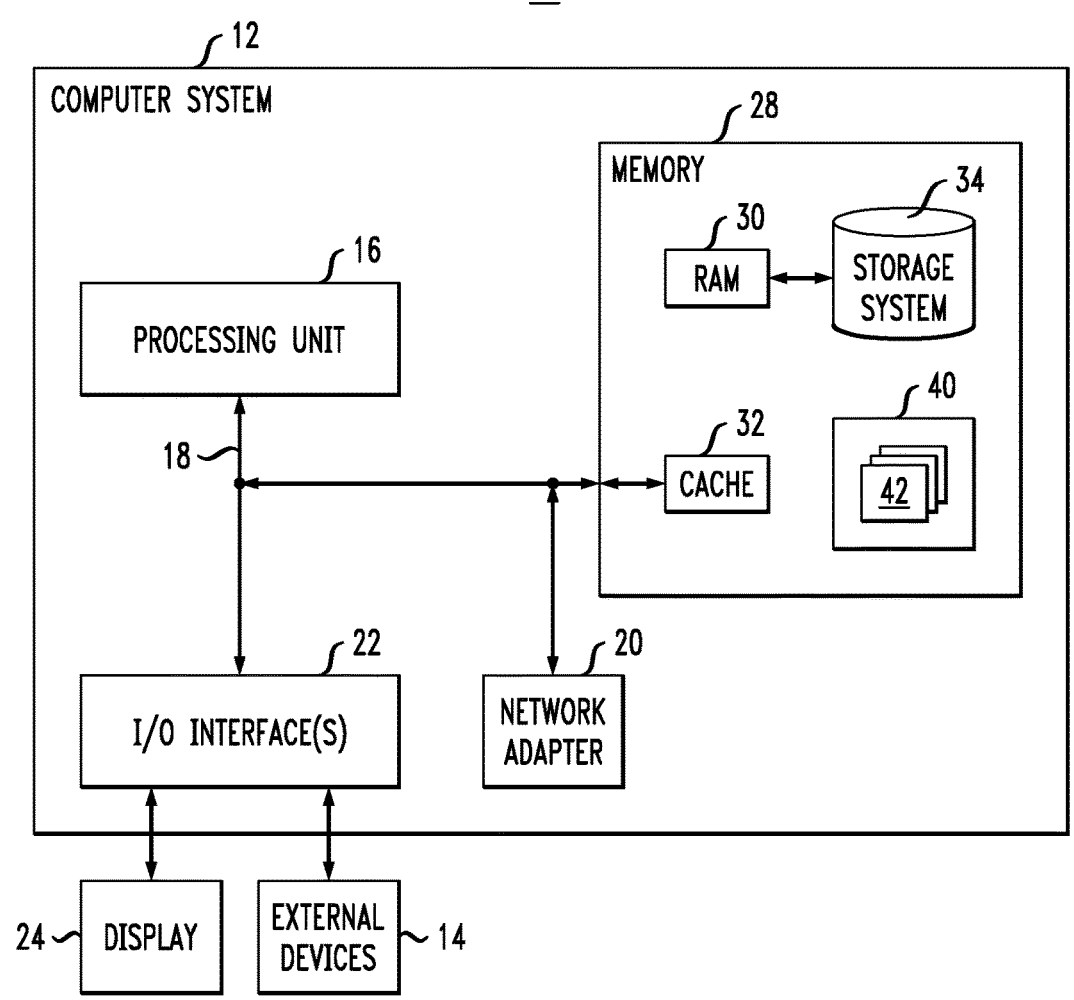
FIG. 17 illustrates a computer system that may be used to implement one or more components/steps of the techniques of the invention, according to an embodiment of the invention.

In FIG. 17, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is be understood that embodiments of the invention can be implemented as a cloud service on one or more cloud computing platforms, while in other embodiments of the invention, implementation of the systems and methods recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 18:
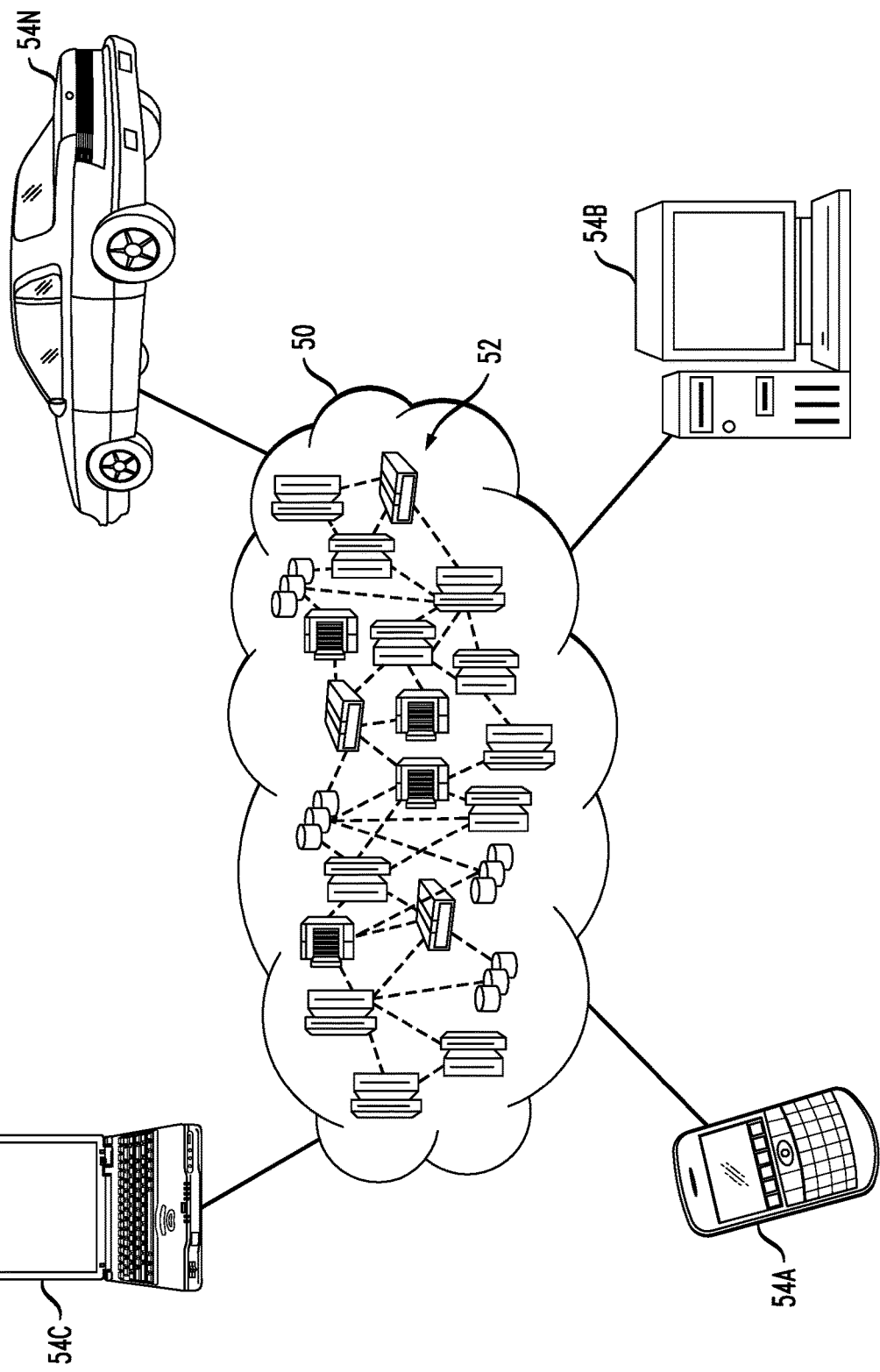
FIG. 18 depicts a cloud computing environment according to an embodiment of the invention.

Referring now to FIG. 18, an illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 18 are intended to be illustrative only and that computing nodes 52 and cloud computing environment 50 can communicate with any type of computerized device over any type of network and/or network addressable connection (e.g., using a web browser).

Figure 19:
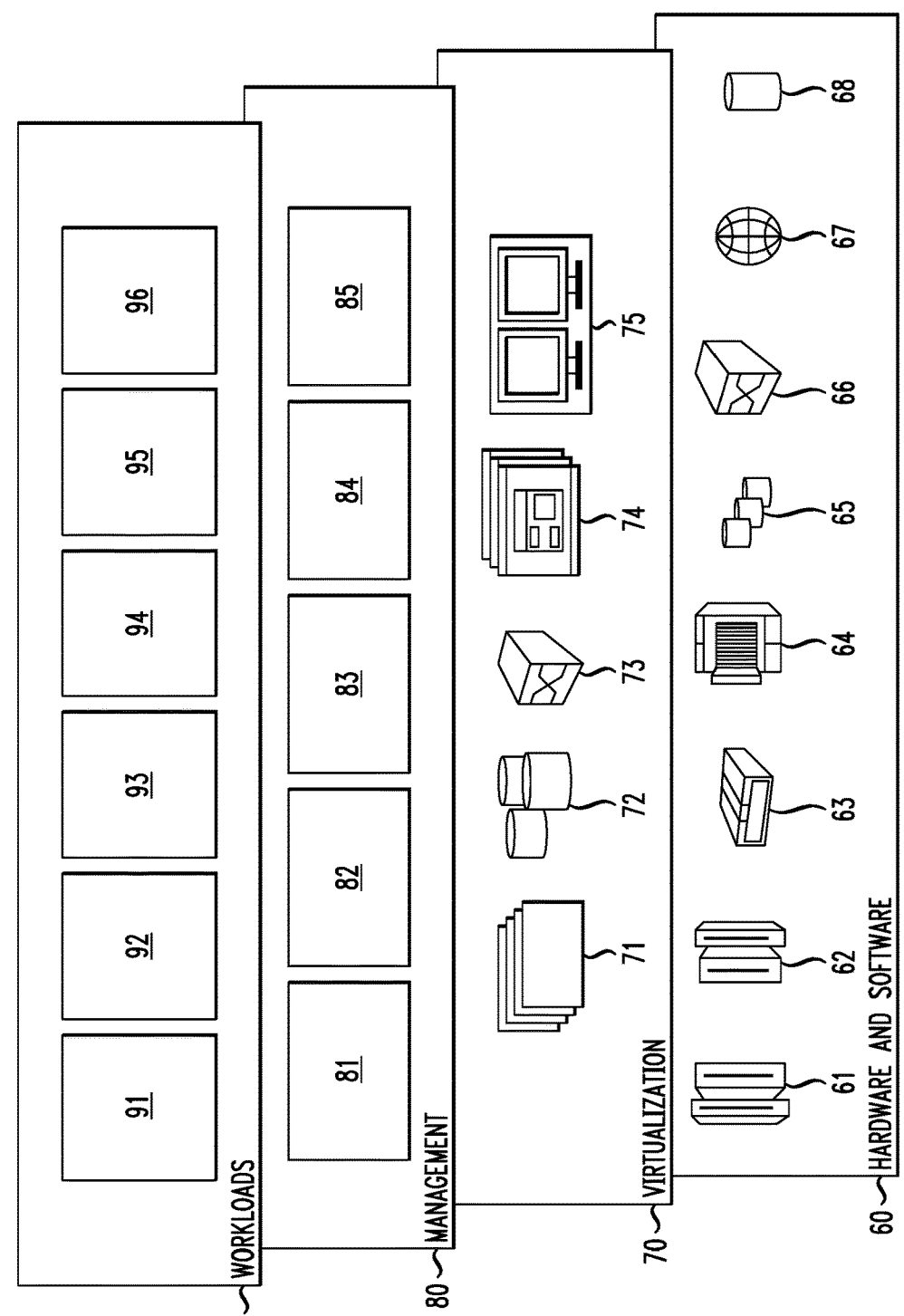
FIG. 19 depicts abstraction model layers according to an embodiment of the invention.

Referring now to FIG. 19, a set of functional abstraction layers provided by cloud computing environment 50 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide functions as described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. In addition, in one embodiment, the management layer 80 implements the service management functionality as discussed above with reference to the systems of FIGS. 1 and 12, for example.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and other typical workloads 96 such as mobile desktop or other workload functions as discussed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain embodiments of the embodiments, the practical application or technical improvement over technologies found in the marketplace, or to enable others of ordinary skill in the art to understand the embodiments disclosed herein.

What is claimed is:

1. A method for managing a computing platform, comprising:

provisioning a plurality of virtual machines that execute on a plurality of computing nodes of a computing platform, wherein the provisioned virtual machines utilize computing resources of the computing nodes; and executing a centralized service management system on at least one computing node of the computing platform to perform service management functions of the computing platform, wherein the service management functions performed by the centralized service management system comprise a process for dynamically adjusting metering operations for monitoring utilization of a computing resource of the plurality of computing nodes, which is utilized by the plurality of virtual machines executing on the plurality of computing nodes of the computing system, wherein the process for dynamically adjusting metering operations comprises:

monitoring the utilization of the computing resource by the provisioned virtual machines executing on the plurality of computing nodes of the computing platform, wherein monitoring comprises collecting data samples from the plurality of computing nodes, wherein the data samples comprise information regarding a metric of the utilization of the monitored resource by the provisioned virtual machines executing on the plurality of computing nodes, wherein the data samples are initially collected at a given sampling frequency, wherein each data sample comprises (i) a timestamp to mark a time that the data sample was collected, and (ii) a sample value of the metric of the utilization of the monitored resource;

storing the collected data samples in a persistent storage system;

analyzing a set of the data samples that are initially collected at the given sampling frequency and stored for the metric of the utilization of the monitored resource to determine an amount of deviation in the sample values of the data samples within the set of data samples that are initially collected at the given sampling frequency for the metric of the utilization of the monitored resource, wherein analyzing the set of data samples comprises (i) generating change point time series data by detecting changes in the sample values of the collected data samples associated with the metric of the utilization of the monitored resource and (ii) and converting the change point time series data into a sequence of symbols which encodes a change behavior of the metric of the utilization of the monitored resource;

determining a new sampling frequency for collecting new data samples for the metric of the utilization of the monitored resource based on the amount of deviation in the sample values of the data samples within the set of data samples for the metric of the utilization of the monitored resource as determined from the sequence of symbols which encodes the change behavior of the metric of the utilization of the monitored resource; and applying the new sampling frequency for collecting new data samples for the metric of the utilization of the monitored resource by the provisioned virtual machines executing on the plurality of computing nodes of the computing platform;

wherein the new sampling frequency for collecting new data samples is less than the given sampling frequency when an encoded symbol for the metric indicates a period of invariable behavior of the metric of utilization of the monitored resource, to thereby reduce an amount of new data samples for the metric of the utilization of the monitored resource which are collected and stored in the persistent storage system;

wherein the method is implemented at least in part by a processor executing program code.

2. The method of claim 1, further comprising assigning a metric policy to the metric of the utilization of the monitored resource based on values of one or more metric profile configuration items associated with the metric.

3. The method of claim 2, wherein determining a new sampling frequency for collecting new data samples for the metric of the utilization of the monitored resource is further based on a metric policy assigned to the metric.

4. The method of claim 2, wherein the metric policy for the metric of the utilization of the monitored resource comprises at least one of conservative sampling, conservative storage, aggregated storage, per tier sampling or a combination thereof, wherein the conservative sampling applies the predefined given sampling frequency for the metric, wherein conservative storage implies that all collected data samples for the metric are stored, wherein aggregated storage implies that an aggregate of the sample values of the collected data samples are stored, or that only changes in the sample values of the collected data samples are stored, and wherein pier tier sampling implies that different sampling frequencies are applied for different behaviors of the metric of the utilization of the monitored resource.

5. The method of claim 2, wherein the one or more metric profile configuration items comprises one of an importance item, a usage item, a dependency item, or a combination thereof.

6. The method of claim 1, wherein the monitored resource comprises one of CPU (central processing unit) usage, memory usage, TCP/IP connection rate, and page access per time.

7. The method of claim 1, wherein determining the new sampling frequency for collecting new data samples for the metric of the utilization of the monitored resource comprises:
   clustering the sequence of symbols into tiers of metrics with similar sequences;
   determining a new sampling frequency for each of the tiers based on the sequences of symbols that are included within the tier.

8. The method of claim 1, further comprising re-applying the given sampling frequency to collect new data samples for the metric of the utilization of the monitored resource when there is one of (i) a detected change in behavior of the metric and (ii) a metric policy update for the metric.

9. The method of claim 1, further comprising:
   aggregating the sample values of the collected data samples for the metric of the utilization of the monitored resource; and
   storing the aggregated sample values of the collected data samples.

10. The method of claim 1, further comprising:
    determining if the metric of the utilization of the monitored resource is correlated to another metric;
    if the metric of the utilization of the monitored resource is determined to be correlated to another metric, then comparing each newly collected data sample for the metric of the utilization of the monitored resource to a last collected and stored data sample for the metric of the utilization of the monitored resource; and
    storing the newly collected data sample only if the sample value of the newly collected sample is different from the sample value of the last collected and stored data sample.

11. An article of manufacture comprising a computer readable storage medium having program instructions embodied therewith, the program instructions executable by a computer to cause the computer to perform a method for managing a computing platform, the method comprising:
    provisioning a plurality of virtual machines that execute on a plurality of computing nodes of a computing platform, wherein the provisioned virtual machines utilize computing resources of the computing nodes; and
    executing a centralized service management system on at least one computing node of the computing platform to perform service management functions of the computing platform, wherein the service management functions performed by the centralized service management system comprise a process for dynamically adjusting metering operations for monitoring utilization of a computing resource of the plurality of computing nodes, which is utilized by the plurality of virtual machines executing on the plurality of computing nodes of the computing system, wherein the process for dynamically adjusting metering operations comprises:
       monitoring the utilization of the computing resource by the provisioned virtual machines executing on the plurality of computing nodes of the computing platform, wherein monitoring comprises collecting data samples from the plurality of computing nodes, wherein the data samples comprise information regarding a metric of the utilization of the monitored resource by the provisioned virtual machines executing on the plurality of computing nodes, wherein the data samples are initially collected at a given sampling frequency, wherein each data sample comprises (i) a timestamp to mark a time that the data sample was collected, and (ii) a sample value of the metric of the utilization of the monitored resource;
       storing the collected data samples in a persistent storage system;
       analyzing a set of the data samples that are initially collected at the given sampling frequency and stored for the metric of the utilization of the monitored resource to determine an amount of deviation in the sample values of the data samples within the set of data samples that are initially collected at the given sampling frequency for the metric of the utilization of the monitored resource, wherein analyzing the set of data samples comprises (i) generating change point time series data by detecting changes in the sample values of the collected data samples associated with the metric of the utilization of the monitored resource and (ii) and converting the change point time series data into a sequence of symbols which encodes a change behavior of the metric of the utilization of the monitored resource;
       determining a new sampling frequency for collecting new data samples for the metric of the utilization of the monitored resource based on the amount of deviation in the sample values of the data samples within the set of data samples for the metric of the utilization of the monitored resource as determined from the sequence of symbols which encodes the change behavior of the metric of the utilization of the monitored resource; and
       applying the new sampling frequency for collecting new data samples for the metric of the utilization of the monitored resource by the provisioned virtual machines executing on the plurality of computing nodes of the computing platform;
       wherein the new sampling frequency for collecting new data samples is less than the given sampling frequency when an encoded symbol for the metric indicates a period of invariable behavior of the metric of utilization of the monitored resource, to thereby reduce an amount of new data samples for the metric of the utilization of the monitored resource which are collected and stored in the persistent storage system.

12. The article of manufacture of claim 11, further comprising assigning a metric policy to the metric of the utilization of the monitored resource based on values of one or more metric profile configuration items associated with the metric.

13. The article of manufacture of claim 12, wherein determining a new sampling frequency for collecting new data samples for the metric of the utilization of the monitored resource is further based on a metric policy assigned to the metric.

14. The article of manufacture of claim 12, wherein the metric policy for the metric of the utilization of the monitored resource comprises at least one of conservative sampling, conservative storage, aggregated storage, per tier sampling or a combination thereof, wherein the conservative sampling applies the given sampling frequency for the metric, wherein conservative storage implies that all collected data samples for the metric are stored, wherein aggregated storage implies that an aggregate of the sample values of the collected data samples are stored, or that only changes in the sample values of the collected data samples are stored, and wherein pier tier sampling implies that different sampling frequencies are applied for different behaviors of the metric of the utilization of the monitored resource.

15. The article of manufacture of claim 11, wherein determining the new sampling frequency for collecting new data samples for the metric of the utilization of the monitored resource, comprises:
clustering the sequence of symbols into tiers of metrics with similar sequences;
determining a new sampling frequency for each of the tiers based on the sequences of symbols that are included within the tier.

16. The article of manufacture of claim 11, further comprising:
aggregating the sample values of the collected data samples for the metric of the utilization of the monitored resource; and
storing the aggregated sample values of the collected data samples.

17. The article of manufacture of claim 11, further comprising:
determining if the metric of the utilization of the monitored resource is correlated to another metric;
if the metric of the utilization of the monitored resource is determined to be correlated to another metric, then comparing each newly collected data sample for the metric of the utilization of the monitored resource to a last collected and stored data sample for the metric of the utilization of the monitored resource; and
storing the newly collected data sample only if the sample value of the newly collected sample is different from the sample value of the last collected and stored data sample.

18. A computing system, comprising:
a plurality of computing nodes, each comprising a plurality of computing resources including memory and processors, wherein a plurality of virtual machines are provisioned across the plurality of computing nodes; and
wherein at least one computing node of the computing comprises a memory which stores program instructions, and a processor which executes the stored program instructions to instantiate a centralized service management system that executes on at least one computing node of the computing platform to perform service management functions of the computing platform, wherein the service management functions performed by the centralized service management system comprise a process for dynamically adjusting metering operations for monitoring utilization of a computing resource of the plurality of computing nodes, which is utilized by the plurality of virtual machines executing on the plurality of computing nodes of the computing system, wherein the process for dynamically adjusting metering operations comprises:
monitoring the utilization of the computing resource by the provisioned virtual machines executing on the plurality of computing nodes of the computing platform, wherein monitoring comprises collecting data samples from the plurality of computing nodes, wherein the data samples comprise information regarding a metric of the utilization of the monitored resource by the provisioned virtual machines executing on the plurality of computing nodes, wherein the data samples are initially collected at a given sampling frequency, wherein each data sample comprises (i) a timestamp to mark a time that the data sample was collected, and (ii) a sample value of the metric of the utilization of the monitored resource;
storing the collected data samples in a persistent storage system;
analyzing a set of the data samples that are initially collected at the given sampling frequency and stored for the metric of the utilization of the monitored resource over a to determine an amount of deviation in the sample values of the data samples within the set of data samples that are initially collected at the given sampling frequency for the metric of the utilization of the monitored resource, wherein analyzing the set of data samples comprises (i) generating change point time series data by detecting changes in the sample values of the collected data samples associated with the metric of the utilization of the monitored resource and (ii) and converting the change point time series data into a sequence of symbols which encodes a change behavior of the metric of the utilization of the monitored resource;
determining a new sampling frequency for collecting new data samples for the metric of the utilization of the monitored resource based on the amount of deviation in the sample values of the data samples within the set of data samples for the metric of the utilization of the monitored resource as determined from the sequence of symbols which encodes the change behavior of the metric of the utilization of the monitored resource; and
applying the new sampling frequency for collecting new data samples for the metric of the utilization of the monitored resource by the provisioned virtual machines executing on the plurality of computing nodes of the computing platform;
wherein the new sampling frequency for collecting new data samples is less than the given sampling frequency when an encoded symbol for the metric indicates a period of invariable behavior of the metric of utilization of the monitored resource, to thereby reduce an amount of new data samples for the metric of the utilization of the monitored resource which are collected and stored in the persistent storage system.

19. The computing system of claim 18, wherein determining the new sampling frequency for collecting new data samples for the metric of the utilization of the monitored resource, comprises:

clustering the sequence of symbols into tiers of metrics with similar sequences;

determining a new sampling frequency for each of the tiers based on the sequences of symbols that are included within the tier.

20. The computing system of claim 18, wherein the process performed by the centralized service management system for dynamically adjusting metering operations further comprises:

assigning a metric policy to the metric of the utilization of the monitored resource based on values of one or more metric profile configuration items associated with the metric, wherein determining the new sampling frequency for collecting new data samples for the metric of the utilization of the monitored resource is further based on a metric policy assigned to the metric; and wherein the metric policy for the metric of the utilization of the monitored resource comprises at least one of conservative sampling, conservative storage, aggregated storage, per tier sampling or a combination thereof, wherein the conservative sampling applies the given sampling frequency for the metric, wherein conservative storage implies that all collected data samples for the metric are stored, wherein aggregated storage implies that an aggregate of the sample values of the collected data samples are stored, or that only changes in the sample values of the collected data samples are stored, and wherein pier tier sampling implies that different sampling frequencies are applied for different behaviors of the metric of the utilization of the monitored resource.

\* \* \* \* \*